United States Patent
Sun et al.

(10) Patent No.: US 9,251,402 B2
(45) Date of Patent: Feb. 2, 2016

(54) ASSOCIATION AND PREDICTION IN FACIAL RECOGNITION

(75) Inventors: Jian Sun, Beijing (CN); Qi Yin, Beijing (CN); Xiaoou Tang, Hong Kong (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 830 days.

(21) Appl. No.: 13/107,800

(22) Filed: May 13, 2011

(65) Prior Publication Data

US 2012/0288166 A1 Nov. 15, 2012

(51) Int. Cl.
G06K 9/00 (2006.01)
G06T 7/00 (2006.01)
G06K 9/46 (2006.01)

(52) U.S. Cl.
CPC ........ *G06K 9/00281* (2013.01); *G06K 9/00221* (2013.01); *G06K 9/00248* (2013.01); *G06K 9/00288* (2013.01); *G06K 9/46* (2013.01); *G06T 7/0044* (2013.01)

(58) Field of Classification Search
USPC ......... 382/115–118, 155, 156, 159, 160, 173, 382/181, 190, 195, 209, 224, 227, 282, 294
See application file for complete search history.

(56) References Cited

U.S. PATENT DOCUMENTS

| | | | |
|---|---|---|---|
| 5,802,208 A * | 9/1998 | Podilchuk et al. | 382/115 |
| 5,828,769 A | 10/1998 | Burns | |
| 6,154,559 A * | 11/2000 | Beardsley | 382/103 |
| 6,181,805 B1 * | 1/2001 | Koike et al. | 382/118 |
| 6,301,370 B1 | 10/2001 | Steffens et al. | |
| 6,671,391 B1 | 12/2003 | Zhang et al. | |
| 6,944,319 B1 | 9/2005 | Huang et al. | |
| 6,975,750 B2 * | 12/2005 | Yan et al. | 382/118 |
| 7,142,697 B2 | 11/2006 | Huang et al. | |
| 7,203,346 B2 | 4/2007 | Kim et al. | |
| 7,254,257 B2 | 8/2007 | Kim et al. | |
| 7,542,592 B2 | 6/2009 | Singh et al. | |
| 7,840,081 B2 | 11/2010 | Paschalakis et al. | |
| 7,848,548 B1 | 12/2010 | Moon et al. | |
| 7,876,320 B2 * | 1/2011 | Marugame | 345/420 |
| 7,894,640 B2 * | 2/2011 | Itou | G06K 9/00255 382/118 |

(Continued)

OTHER PUBLICATIONS

Ahonen et al., "Face Description with Local Binary Patterns: Application to Face Recognition," retrieved at <<http://citeseerx.ist.psu.edu/viewdoc/download?doi=10.1.1.106.6396&rep=rep1&type=pdf>>, IEEE Transactions on Pattern Analysis and machine Intelligence, Dec. 2006, 15 pages.

(Continued)

*Primary Examiner* — Eric Rush
(74) *Attorney, Agent, or Firm* — Sandy Swain; Micky Minhas; Lee & Hayes PLLC

(57) ABSTRACT

Some implementations provide techniques and arrangements to address intrapersonal variations encountered during facial recognition. For example, some implementations employ an identity data set having a plurality of images representing different intrapersonal settings. A predictive model may associate one or more input images with one or more images in the identity data set. Some implementations may use an appearance-prediction approach to compare two images by predicting an appearance of at least one of the images under an intrapersonal setting of the other image. Further, some implementations may utilize a likelihood-prediction approach for comparing images that generates a classifier for an input image based on an association of an input image with the identity data set.

20 Claims, 10 Drawing Sheets

(56) References Cited

U.S. PATENT DOCUMENTS

| | | | |
|---|---|---|---|
| 8,073,287 B1 | 12/2011 | Wechsler et al. | |
| 8,098,938 B1 | 1/2012 | Buddemeier et al. | |
| 8,180,112 B2* | 5/2012 | Kurtz et al. | 382/115 |
| 8,249,310 B2 | 8/2012 | Okubo | |
| 8,472,722 B2* | 6/2013 | Nayar | G06T 11/60 382/190 |
| 8,532,344 B2* | 9/2013 | Connell | G06T 11/00 382/118 |
| 2003/0007669 A1* | 1/2003 | Martinez | 382/118 |
| 2003/0169908 A1 | 9/2003 | Kim et al. | |
| 2004/0170305 A1 | 9/2004 | Kim et al. | |
| 2005/0013507 A1 | 1/2005 | Lee et al. | |
| 2006/0034517 A1 | 2/2006 | Bober et al. | |
| 2006/0067573 A1 | 3/2006 | Parr et al. | |
| 2006/0120571 A1* | 6/2006 | Tu et al. | 382/118 |
| 2008/0212899 A1 | 9/2008 | Gokturk et al. | |
| 2008/0310687 A1* | 12/2008 | Hua et al. | 382/118 |
| 2008/0310720 A1 | 12/2008 | Park et al. | |
| 2009/0060290 A1 | 3/2009 | Sabe et al. | |
| 2009/0180671 A1* | 7/2009 | Lee et al. | 382/118 |
| 2009/0180672 A1* | 7/2009 | Ishiyama | 382/118 |
| 2009/0196467 A1* | 8/2009 | Okubo | 382/118 |
| 2009/0309878 A1* | 12/2009 | Otani et al. | 345/427 |
| 2010/0049675 A1 | 2/2010 | Ning et al. | |
| 2010/0246906 A1 | 9/2010 | Lovell et al. | |
| 2010/0284577 A1 | 11/2010 | Hua et al. | |
| 2011/0293189 A1 | 12/2011 | Sun et al. | |

OTHER PUBLICATIONS

Belhumeur et al., "Eigenfaces vs. Fisherfaces: Recognition using Class Specific Linear Projection", IEEE Transactions on pattern Analysis and machine intelligence, vol. 19, No. 7, Jul. 1997, retrieved at <<http://ieeexplore.ieee.org/stamp/stamp.jsp?tp=&arnumber=598228>>, 10 pages.

Blanz et al., "Face Recognition Based on Fitting a 3D Morphable Model", IEEE Transactions on Pattern Analysis and Machine Intelligence, vol. 25, No. 9, Sep. 2003, retrieved at <<http://ieeexplore.ieee.org/stamp/stamp.jsp?tp=&arnumber=1227983>>, pp. 1063-1074.

Cao et al., "Face Recognition with Learningbased Descriptor", 2010 IEEE Computer Society Conference on Computer Vision and Pattern Recognition, San Francisco, CA, Jun. 13-18, 2010, retrieved at <<http://research.microsoft.com/en-us/um/people/jiansun/papers/cypr10_facereco.pdf>>, 8 pages.

Chang et al., "LIBSVM: a Library for Support Vector Machines," retrieved at <<http://www.csie.ntu.edu.tw/~cjlin/papers/libsvm.pdf>>, Initial version: 2001, Last updated Jan. 1, 2011, 32 pages.

Choi et al., "An Effective Face Recognition under Illumination and Pose Variations", 2007, retrieved at <<http://csl.snu.ac.kr/publication/paper/07IJCNN_final_paper.pdf>>, 6 pages.

Cootes et al., "Active Appearance Models," retrieved at <<http://www.isbe.man.ac.uk/~bim/Models/eccv98_aam.pdf>>, Proc. European Conference on Computer Vision 1998, vol. 2, pp. 484-498, Springer, 1998.

Dalal et al., "Histograms of Oriented Gradients for Human Detection", 2005 IEEE Computer Society Conference on Computer Vision and Pattern Recognition (CVPR'05), San Diego, CA, Jun. 20-26, 2005, 8 pages.

Face Recognition, National Science and Technology Council, retrieved at <<http://www.biometricscatalog.org/NSTCSubcommittee/Documents/Face%20Recognition.pdf>>, Mar. 27, 2006, 10 pages.

Gross et al.,"Multi-PIE", IEEE, 2008, retrieved at <<http://research.microsoft.com/pubs/69512/multipie-fg-08.pdf>>, 8 pages.

Guillaumin et al., "Is that you? Metric Learning Approaches for Face Identification", 2009 IEEE 12th International Conference on Computer vision, retrieved at <<http://ieeexplore.ieee.org/stamp/stamp.jsp?tp=&arnumber=5459197>>, 8 pages.

Hawkins et al, "On Intelligence". Times Books, Henry Holt and Company, New York, 2004, retrieved from <<http://bib.tiera.ru/DVD-016/Hawkins_J.,_Blakeslee_S._On_Intelligence_2005)(en)(98s).pdf>>, 98 pages.

Hua et al., "A Robust Elastic and Partial Matching Metric for Face Recognition", 2009 IEEE 12th International Conference on Computer Vision, Sep. 29-Oct. 2, 2009, retrieved at <<http://users.eecs.northwestern.edu/~ganghua/publication/ICCV09a.pdf>>, 8 pages.

Hua et al., "Face Recognition using Discriminatively Trained Orthogonal Rank One Tensor Projections", IEEE Conference on Computer Vision and pattern Recognition, Jun. 17-22, 2007, Menneapolis, MN, retrieved at <<http://ieeexplore.ieee.org/stamp/stamp.jsp?tp=arnumber=4270132 >>, 8 pages.

Huang et al., "Labeled Faces in the Wild: A Database for Studying Face Recognition in Unconstrained Environments," retrieved at <<http://www.tamaraberg.com/papers/lfw.pdf>>, Technical Report 07-49, UMass, 2007, 11 pages.

Huang et al., "Unsupervised Joint Alignment of Complex Images," retrieved at <<http://citeseerx.ist.psu.edu/viewdoc/download-?doi=10.1.1.64.9868&rep=rep1&type=pdf>>, IEEE 11th International Conference on Computer Vision, Oct. 14-21, 2007, 8 pages.

Karande et al., "Face Recognition under Variation of Pose and Illumination using Independent Component Analysis," retrieved at <<http://www.icgst.com/gvip/volume8/issue4/p1150802003.pdf>>, ICGST-GVIP, ISSN 1687-398X, vol. (8), Issue (IV), Dec. 2008, 6 pages.

Kim et al., "Locally Linear Discriminant Analysis for Multimodally Distributed Classes for Face Recognition with a Single Model Image", IEEE Transactions on Pattern Analysis and Machine Intelligence, vol. 27, No. 3, Mar. 2005, pp. 318-327.

Kramer, "Nonlinear Principal Component Analysis using Autoassociative Neural Networks", AIChE Journal, Feb. 1991, vol. 37, No. 2, retrieved from <<http://math.stanford.edu/research/comptop/references/kr.pdf>>, pp. 233-243.

Kumar et al., "Attribute and Simile Classifiers for Face Verification", 2009 IEEE 12th International Conference on Computer Vision, Sep. 29-Oct. 2, 2009, Kyoto, retrieved from <<http://ieeexplore.ieee.org/stamp/stamp.jsp?tp=&arnumber=5459250>>, 8 pages.

Kumar et al., "FaceTracer: A Search Engine for Large Collections of Images with Faces", Proceedings of the 10th European Conference on Computer Vision: Part IV, 2008, retrieved from <<http://www1.cs.columbia.edu/CAVE/publications/pdfs/Kumar_ECCV08.pdf>>, 14 pages.

Lee et al., "Face Verification and Identification using Facial Trait Code", IEEE, (c) 2009, retrieved at <<http://ieeexplore.ieee.org/stamp/stamp.jsp?tp=&arnumber=5206830>>, 8 pages.

Liang et al., "Face Alignment via Component-based Discriminative Search," retrieved at <<http://research.microsoft.com/en-us/um/people/jiansun/papers/ECCV08_FaceAlign.pdf>>, European Conference on Computer Vision. 2008, 14 pages.

LIBSVM: A Library for Support Vector Machines, retrieved at <<http://www.csie.ntu.edu.tw/~cjlin/papers/libsvm.pdf>>, Inital version: 2001, Last updated: Mar. 13, 201, 39 pages.

Liu et al., "Face Recognition using Kernel Based Fisher Discriminant Analysis", IEEE International Confrence on Automatic Face and Gestur Recognition, 2002, retrieved from <<http://paul.rutgers.edu/~ruihuang/papers/qliu_fgr02.pdf>>, 5 pages.

Lowe, "Distinctive Image Features from Scale-Invariant Keypoints", Jan. 5, 2004, International Journal of Computer Vision, retrieved at <<http://www.cs.ubc.ca/~lowe/papers/ijcv04.pdf>>, 28 pages.

Moghaddam et al., "Bayesian Face Recognition", TR2000-53, Feb. 2002, retrieved from <<http://www.cs.columbia.edu/~jebara/papers/TR2000-42.pdf>>, 16 pages.

Ojala et al., "Multiresolution Gray-Scale and Rotation Invariant Texture Classification with Local Binary Patterns", IEEE Transactions on Pattern Analysis and Machine Intelligence, vol. 24, No. 7, Jul. 2002, retrieved at <<http://ieeexplore.ieee.org/stamp/stamp.jsp?tp=&arnumber=1017623>>, 17 pages.

Pinto et al., "How Far can you get with a Modern Face Recognition Test Set using Only Simple Features?", 2009 IEEE Conference on Computer Vision and Pattern Recognition, Jun. 20-25, 2009, Miami, FL, retrieved at <<http://ieeexplore.ieee.org/stamp/stamp.jsp?tp=&arnumber=5206605>>, 9 pages.

Rodriguez, "Face Detection and Verification using Local Binary Patterns," retrieved at <<http://www.idiap.ch/~rodrig/publications/pdf/rodrig-thesis-2006.pdf>>, Lausanne, 2006, 150 pages.

(56) References Cited

OTHER PUBLICATIONS

Shan et al., "Extended Fisherface for Face Recognition from a Single Example Image per Person", 2002 IEEE International Symposium on Circuits and Systems, May 26-29, 2002, Phoenix-Scottsdale, AZ, retrieved at <<http://ieeexplore.ieee.org/xpl/freeabs_all.jsp?arnumber=1010929>>, 4 pages.

Su et al., "Adaptive Generic Learning for Face Recognition from a Single Sample per Person", 2010 IEEE Computer Society Conference on Computer Vision and Pattern Recognition, Jun. 13-18, 2010, San Francisco, CA, retrieved at <<http://yoshi.cs.ucla.edu/upload/CVPR10/data/papers/1611.pdf>>, 8 pages.

Taigman et al., "Multiple One-Shots for Utilizing Class Label Information", 2009, retrieved at <<http://www.openu.ac.il/home/hassner/projects/multishot/TWH_BMVC09_Multishot.pdf>>, 12 pages.

Tan et al., "Enhanced Local Texture Feature Sets for Face Recognition under Difficult Lighting Conditions", Proceedings of the 3rd international conference on Analysis and modeling of faces and gestures, Springer-Verlag Berlin, Heidelberg, 2007, retrieved at <<http://class.inrialpes.fr/pub/201-tan-amfg07a.pdf>>, 15 pages.

Tang et al., "Face Sketch Recognition", IEEE Transactions on Circuits and Systems for Video Technology, vol. 14, No. 1, Jan. 2004, retrieved at <<http://www.ee.cuhk.edu.hk/~xgwang/papers/wangTcsvt04.pdf>>, 8 pages.

Tang, "Texture Information in Run-Length Matrices," retrieved at <<http://ieeexplore.ieee.org/stamp/stamp.jsp?tp=&arnumber=725367>>, IEEE transactons on Image Processing, vol. 7, No. 11, Nov. 1998, 8 pages.

Turk et al., "Face Recognition using Eigenfaces", IEEE Computer Society Conference on Computer Vision and Patern Recognition, Jun. 3-6, 1991, Maui, HI, retrieved at <<http://www.morehouse.edu/facstaff/ajohnson/mypapers/ Eigenfaces.pdf>>, 6 pages.

Wang et al., "A Unified Framework for Subspace Face Recognition", IEEE Transactions on Pattern Analysis and Machine Intelligence, vol. 26, No. 9, Sep. 2004, retrieved at <<http://137.189.97.85/2004/PAMI04_Face.pdf>>, 7 pages.

Wang et al., "Improving Face Recognition by Online Image Alignment," retrieved at <<http://ieeexplore.ieee.org/stamp/stamp.jsp?tp=&arnumber=1698895>>, Proceedings of the 18th International Conference on Pattern Recognition (ICPR'06), (c) 2006, 4 pages.

Wang et al., "On solving the face recognition problem with one training sample per subject", retrieved at <<http://www.comm.toronto.edu/~kostas/Publications2008/pub/90.pdf>>, Pattern Recognition, vol. 39, Issue 9, Sep. 2006, pp. 1746-1762.

Wang et al., "Random Sampling for Subspace Face Recognition", International Journal of Computer Vision 70(1), 91-104, 2006, retrieved at <<http://mmlab.ie.cuhk.edu.hk/2006/IJCV06_face.pdf>>, 14 pages.

Wiskott et al., "Face Recognition by Elastic Bunch Graph Matching", IEEE Transactions on Pattern Analysis and Machine Intelligence, vol. 19, No. 7, Jul. 1997, retrieved at <<http://ai.pku.edu.cn/biometrics2008/download/paper/face/1997-Facec%20recognition%20by%20elastic%20bunch%20graph%20matching.pdf>>, pp. 775-779.

Wolf et al., "Descriptor Based Methods in the Wild", Faces in real-life images workshop, 2008, retrieved at <<http://www.openu.ac.il/home/hassner/projects/Patchlbp/WolfHassnerTaigman_ECCVW08.pdf>>, 14 pages.

Wolf et al., "Similarity Scores based on Background Samples", Computer Vision ACCV 2009, Lecture Notes in Computer Science, 2010, vol. 5995/2010, retrieved at <<http://www.openu.ac.il/home/hassner/projects/bgoss/ ACCV09WolfHassnerTaigman.>>, 88-97.

Wright et al., "Implicit Elastic Matching with Random Projections for Pose-Variant Face Recognition", IEEE Conference on Computer Vision Pattern Recognition, Jun. 20-25, 2009, Miami, FL, retrieved at <<http://ieeexplore.ieee.org/stamp/ stamp.jsp?tp=&arnumber=5206786>>, 8 pages.

Yang et al., "Face Recognition using Kernel Eigenfaces", IEEE (c) 2000, retrieved at <<http://ieeexplore.ieee.org/stamp/stamp.jsp?tp=&arnumber=900886>>, 4 pages.

Zhang et al., "Face Detection Based on Multi-Block LBP Representation", Advances in Biometrics, Lecture Notes in Computer Science, 2007, vol. 4642/2007, retrieved at <<http://nlpr-web.ia.ac.cn/2007papers/gjhy/gh101.pdf>>, pp. 11-18.

Office action for U.S. Appl. No. 13/107,856, mailed on Jan. 16, 2014, Sun, et al., "Pose-Robust Recognition", 49 pages.

Final Office Action for U.S. Appl. No. 13/107,856, mailed on Aug. 14, 2014, Jian Sun, "Pose-Robust Recognition", 42 pages.

Tan, et al., "Fusing Gabor and LBP Feature Sets for Kernel-Based Face Recognition", Analysis and Modeling of Faces and Gestures, Lecture Notes in Computer Science, vol. 4778, Springer Berlin Heidelberg, 2007, pp. 235-249.

Office action for U.S. Appl. No. 13/107,856, mailed on Apr. 8, 2015, Sun et al., "Pose-Robust Recognition", 21 pages.

* cited by examiner

ASSOCIATION AND PREDICTION IN FACIAL RECOGNITION

BACKGROUND

Automated facial recognition typically involves capturing an image of a face for recognition and then comparing various features from the captured image against corresponding features in one or more stored images to attempt to identify a match between the captured image and the one or more stored images. This appearance-based approach to facial recognition is popular because of its simplicity and good performance. However, this approach is of limited usefulness when there is a large intrapersonal variation between the captured image and the one or more stored images. Examples of such intrapersonal variations may include different viewing angles or poses, different levels of illumination, different facial expressions, partially obscured facial features, aging, and the like. For instance, when an image of a person is captured from a side angle, conventional facial recognition techniques may have difficulty matching the captured image with a stored image of the same person taken, for example, from a frontal pose.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques and arrangements to address intrapersonal variations encountered during facial recognition. For example, some implementations employ an identity data set having a plurality of images of at least one person in two or more different intrapersonal settings. A predictive model may associate an input image with one or more images in the identity data set. Some implementations of the predictive model may utilize an appearance-prediction approach for recognition that uses a predicted appearance of the input image based on the association with the identity data set. Other implementations of the predictive model may utilize a likelihood-prediction approach for recognition that uses a classifier based on the association with the identity data set.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Facial Recognition

Figure 1:
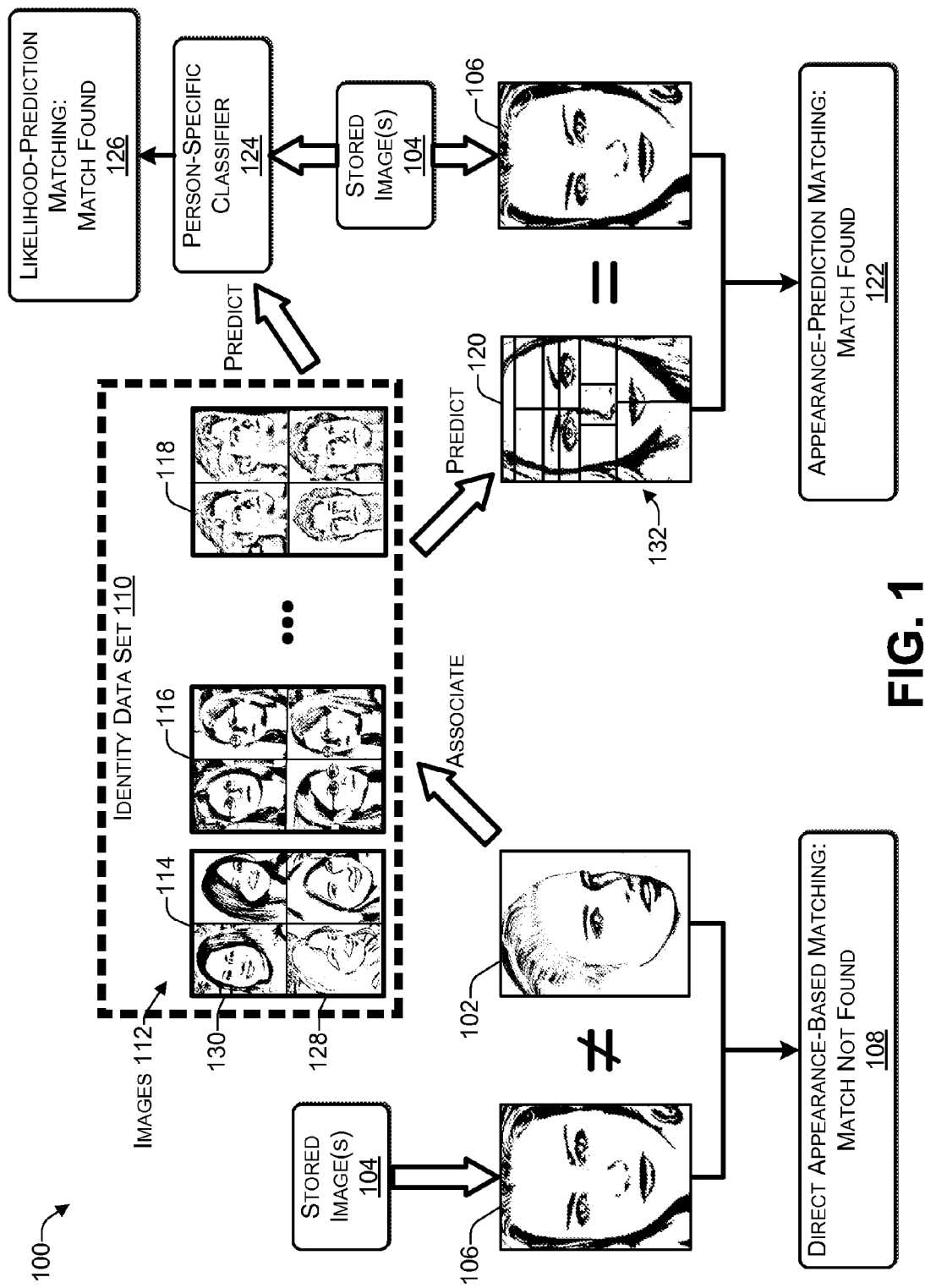
FIG. 1 is a block diagram of an example predictive model for facial recognition according to some implementations.

The technologies described herein generally relate to automated recognition. For instance, some implementations provide techniques to address intrapersonal variations that may be encountered during facial recognition or similar recognition tasks. Some implementations may employ a predictive model that relies on a generic identity data set. For example, based on the identity data set, the predictive model herein may predict how an input face image, or a portion thereof, would appear under a different intrapersonal setting, such as a different pose angle, different lighting, different expression, or the like. In some implementations, the predictive model may use the predicted appearance for attempting to recognize the image using appearance matching. Additionally or alternatively, as a recognition output, some implementations may directly predict whether two face images having different intrapersonal qualities are from the same person. Furthermore, some implementations may utilize a switching mechanism to improve a generalization ability of the predictive model disclosed herein.

Intrapersonal variations in qualities or settings (e.g., differences in pose angles, differences in illumination levels, differences in expressions, and/or partially obscured images—referred to hereafter as "intrapersonal settings") provide a challenge when attempting to achieve high-accuracy in facial recognition. For example, the similarity between human faces under significantly different intrapersonal settings can be difficult to measure. However, implementations herein are able to address variations in intrapersonal settings using a predictive model that associates an image for recognition with one or more intrapersonal settings. Subsequently, a prediction technique may be applied to perform recognition based on the association. For example, some implementations may apply an appearance-prediction technique, while other implementations may apply a likelihood-prediction technique. Further, to achieve increased accuracy, a switching mechanism may be applied to switch from the predictive model to a direct recognition technique when the association indicates that there is little variation in the intrapersonal settings of two images.

The predictive model may be based, at least in part, on a generic identity data set. For example, the identity data set may include one or more identities. Each identity in the identity data set may contain multiple images of the same person with one or more variations in intrapersonal settings between the multiple images. For example, suppose that two face images (i.e., a first face image and a second face image) are provided under significantly different intrapersonal settings (e.g., one face image may be non-frontal and the other face image may be frontal). To enable comparison and matching of the two faces, some implementations may initially associate one of the face images (e.g., the first face image) with one or more similar identities from the generic identity data set. Using one or more associated faces from the one or more similar identities, some instances may generatively predict the appearance of the first face image under the intrapersonal setting of the second face image. Alternatively, other instances may discriminatively predict a likelihood that the first face image and the second face image are from the same person. These two prediction techniques are referred to herein as "appearance-prediction" and "likelihood-prediction," respectively. Accordingly, by leveraging a generic identity data set into the predictive model, implementations herein can effectively compensate for intrapersonal variations between multiple images.

To improve the generalization ability of the predictive model, some implementations may employ a switching mechanism. For example, if the association shows that the two images have similar intrapersonal settings, some instances may switch to a direct appearance-matching comparison technique that directly compares the appearance of two images without using the prediction techniques described herein. Otherwise, if the association indicates that the intrapersonal settings of the two images are not similar, implementations herein may utilize one or more of the prediction techniques herein for performing the recognition.

Predictive Model

FIG. 1 illustrates an example of a predictive model 100 according to some implementations. In this example, suppose that an input image 102 is received for recognition. Conventional facial recognition techniques (e.g., appearance-based matching) may directly compare the input image 102 with one or more other images, such as one or more stored images 104. For example, even though a particular stored image 106 of the same person is contained within the stored images 104, direct appearance-based matching may not recognize a match, as indicated at block 108, because the input image 102 is set at a different angle than the particular stored image 106.

On the other hand, the predictive model 100 may employ an identity data set 110 that includes a plurality of images 112 of other people or identities 114, 116 and 118. For example, for each identity 114-118, a plurality of different images 112 of an individual may be contained in the identity. Each different image 112 in the respective identities 114-118 may be of a different pose, lighting, expression, obscured view, or other different intrapersonal setting for that individual. The input image 102 may be associated with at least one of the identities 114-118 in the identity data set 110 that is similar in appearance. For instance, the input image 102 may be associated with one or more of the images 112 taken at a similar angle, similar pose, under similar lighting, or the like. The images 112 may be used to predict how the input image 102 would appear in a different intrapersonal setting, such as a full frontal pose, as depicted by predicted image 120. In some implementations, prediction-appearance-based matching may be performed using the predicted face in the predicted image 120, which may result in a match being found with the particular stored image 106, as indicated by block 122.

In other implementations, the association may be used to generate a person-specific classifier 124 for predicting the likelihood of a match. For example, the predictive model 100 may be specifically computed for each person. Implementations herein may then use one or more similar identities 114-118 as "friends" to distinguish from other faces. The one or more stored images 104 may be fed into the person-specific classifier 124, and a match may also, or alternatively, be found in this way as shown at block 126.

In the example of FIG. 1, the face in input image 102 and the face in the particular stored image 106 are two faces of the same person. However, because of the difference in settings, the appearances of the two faces in the two images 102 and 106 are so different that typical appearance-based approaches may draw a conclusion that the two images are not a match. Implementations of the predictive model 100 herein may employ the multiple images 112 of one or more other people, and transitions between the multiple images, to predict possible transitions between the face of the input image 102 from one setting to another. Thus, some implementations may associate similar facial patterns from a plurality of face images 112 in the identity data set 110, and envisage an appearance of the input face, or an appearance of a portion of the input face, under a different setting. For instance, the predictive model 100 may predict a transformation from a non-frontal face image, such as in the input image 102, to a full frontal version of the face, as in the predicted image 120. Further, in some implementations, rather than transforming the entire face to a different setting, the face is divided into a plurality of portions, and the portions of the face may be each transformed individually to a predicted appearance for a desired setting.

As mentioned above, the predictive model 100 employs the identity data set 110, which includes images 112 of a plurality of identities 114-118. Each identity 114-118 in the identity data set 110 may have multiple face images having at least some intrapersonal variation. For example, the intrapersonal variation for each identity 114-118 may include a plurality of different images corresponding to different poses, different lighting, different expressions, obscured facial views, and the like. Thus, in some aspects, the identity data set 110 may serve as a sort of bridge that indicates how the same face may vary or transition under different intrapersonal settings. Furthermore, to improve the accuracy of the predictive model 100, the predictive model 100 may first associate the input face with one or more similar identities in the identity data set 110. For example, from among the three identities in the identity data set 110, suppose that the predictive model 100 determines that identity 114 looks most similar to the person in the input image 102. Thus, the model 100 may determine that at least a portion of a specific first face image 128 from the identity 114 is similar to the image 102. For instance, the specific first face image 128 may be similar in setting and at least a portion of the image of the person depicted therein may also be somewhat similar in appearance. In some implementations, the predictive model 100 may then predict a new appearance of at least the portion of the input face in image 102 under different settings (referred to herein as "appearance-prediction") or may directly predict the recognition output (referred to herein as "likelihood-prediction"), each of which is described in additional detail below.

In the "appearance-prediction" approach, given the input face 102, the model 100 may select one or more identities to use based on a similarity with the input image 102, such as identity 114, as discussed above. The model 100 may also select another image from identity 114 such as second face image 130, having an intrapersonal setting similar to one or more images with which the input image 102 will be compared. For example, if the one or more stored images 104 are full frontal images, having optimum lighting, neutral expressions, the model may select at least a corresponding portion of a full frontal image having similar lighting and expression from the identity 114, which in this example is at least a portion of image 130. Thus, at least a portion of the selected second image 130 may have an intrapersonal setting that is consistent with the one or more stored images 104 with which the input image 102 will be compared. At least a portion of the selected second face image 130 may serve as a portion of the predicted image 120 from one setting to another setting. Accordingly, based on the transition between the first face image 128 and the second face image 130, at least a portion of the input image 102 may be transformed into the same setting as the one or more stored images 104. This technique may be repeated for multiple portions of the input image to obtain the predicted image 120. When the predicted image 120 has been obtained, the predictive model 100 may use an appropriate appearance-based matching technique to compare the predicted image 120 with the one or more stored images 104. Accordingly, the predictive model 100 may then perform a direct appearance comparison between the predicted image 120 and the one or more stored images 104.

Alternatively, in the "likelihood-prediction" approach, the predictive model 100 may associate one or more of the most similar identities (e.g., identity 114) with the input image 102. The predictive model 100 may then construct a discriminative classifier using the associated faces of the one or more identities as positive samples and using a fixed set of "background" face images as negative samples. The discriminative classifier thus becomes a trained person-specific classifier 124 that may be used to determine whether the input face and one or more of the stored images 104 are from the same person. For example, the associated positive samples cover a wider intrapersonal variation, and the resulting person-specific classifier 124 can preserve person-specific discriminative information. Consequently, the person-specific classifier 124 is robust to apparent intrapersonal variation.

Additionally, the term "face" may be used in some implementations herein to describe the basic matching element. However, as mentioned above, some implementations do not compare an entire face as a unit, and instead, may use a plurality of (e.g., twelve) portions or facial components 132 as the basic elements for the association and prediction. These implementations may then associate a similar generic identity at the granularity of the facial component level, rather than at the granularity of an entire face.

Furthermore, some implementations of the predictive model 100 may include a switching mechanism (not shown in FIG. 1). For instance, the predictive model 100 is suitable for use in situations in which the intrapersonal settings of two faces to be compared are quite different. However, due to the limited size of the identity data set 110, the predictive model 100 may be less discriminative than conventional direct appearance comparison when two faces to be compared have similar intrapersonal settings. Accordingly, some implementations herein switch to direct appearance matching when two faces to be compared have close intrapersonal settings. Otherwise, when the two faces do not have close intrapersonal settings, implementations herein apply the predictive model 100 to handle the large intrapersonal variation. With the predictive model 100 and the switching mechanism, some implementations herein may provide significant improvement over conventional appearance-based techniques.

Identity Data Set

Figure 2:
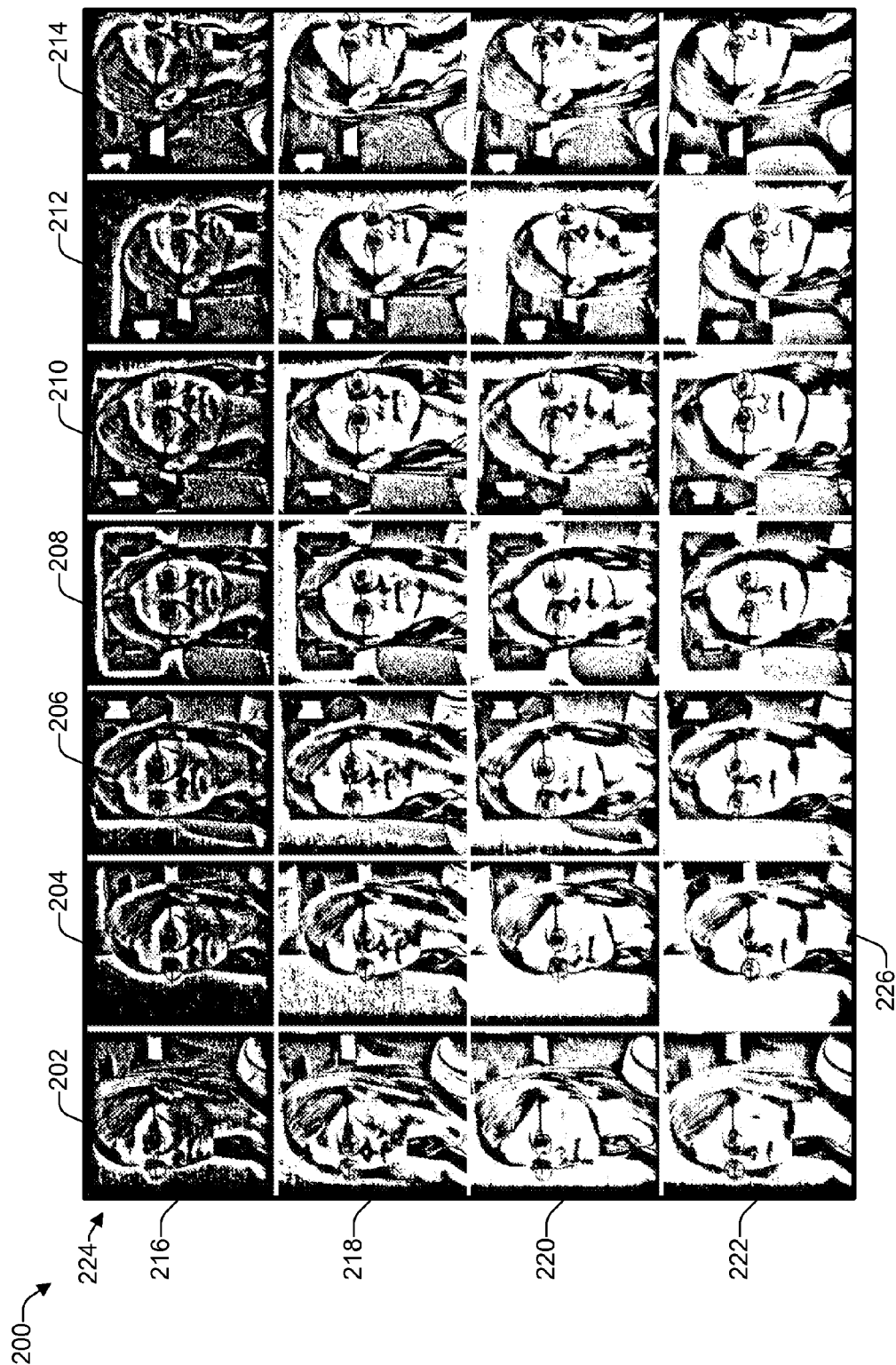
FIG. 2 illustrates an example identity that includes intrapersonal variations and that may be contained in an identity data set according to some implementations.

FIG. 2 illustrates an example identity 200 according to some implementations that may be included in an identity data set, such as the identity data set 110 described above. In this example, the identity 200 contains seven different pose categories 202-214 and four different illumination categories 216-222 represented as 28 different images 224. The pose categories range from −60 degrees at 202 to +60 degrees at 214 to cover horizontal in-plane rotation, with pose category 208 being a full frontal pose setting. The four illumination categories are no-flash 216, left-flash 218, right-flash 220, and left-right-flash 222. Similar identities may be created using a plurality of different people, and may be compiled into an identity data set, such as the identity data set 110 described above. This identity data set can be used as prior knowledge or baseline data for the predictive model 100. Further, the identities used to construct the identity data set may be mutually exclusive any input image actually compared for facial recognition. Additionally, while the identity 200 includes 28 images 224, in other implementations, an identity 200 may include more or fewer images. For example, some identities in the identity data set may include a different number of images from other identities. An example of a suitable dataset according to some implementations is the Multi-PIE face database which is available through Carnegie Mellon University, Pittsburg, Pa., USA.

Furthermore, identities herein may include images showing different expression, poses rotated in other directions, different lighting effects, partially obscured faces, and the like. Thus, the example identity 200 of FIG. 2 is just a non-limiting illustrative example provided for discussion purposes. In the illustrated example of FIG. 2, the identity 200 may be useful for estimating two kinds of intrapersonal settings: pose and illumination. However, other implementations may incorporate more (or fewer) types of intrapersonal settings or attributes such as expression, gender and age. Thus, implementations herein are able to adopt a setting estimation technique based on the identities in the generic identity data set. As shown in the example of FIG. 2, some implementations include seven pose categories and four illumination categories as $\{P_i | i=1, 2, 3, \ldots, 7\}$ and $\{L_i | i=1, 2, 3, 4\}$, respectively. Thus a particular intrapersonal setting may be described as a pair $\{P, L\}$. For example, the intrapersonal setting for image 226 in identity 200 may be described by the pair $\{2, 4\}$. Further, while one technique for categorizing or quantizing intrapersonal settings is described herein for convenience of description, other suitable methods that may be used will be apparent to those of skill in the art in view of the disclosure herein. To estimate the pose, implementations herein may average face descriptors of some or all of the identities in the identity data set with the specific pose to generate a template model for each pose category. Then implementations herein may measure the similarity between the input face with the template faces, and may assign the pose category of the template determined to be most similar to the input face. The illumination estimation adopts the same mechanism to assign the illumination setting to the input face. Transitions between other types of intrapersonal settings may be similarly determined in other implementations.

Face Representation Example

Figure 3:
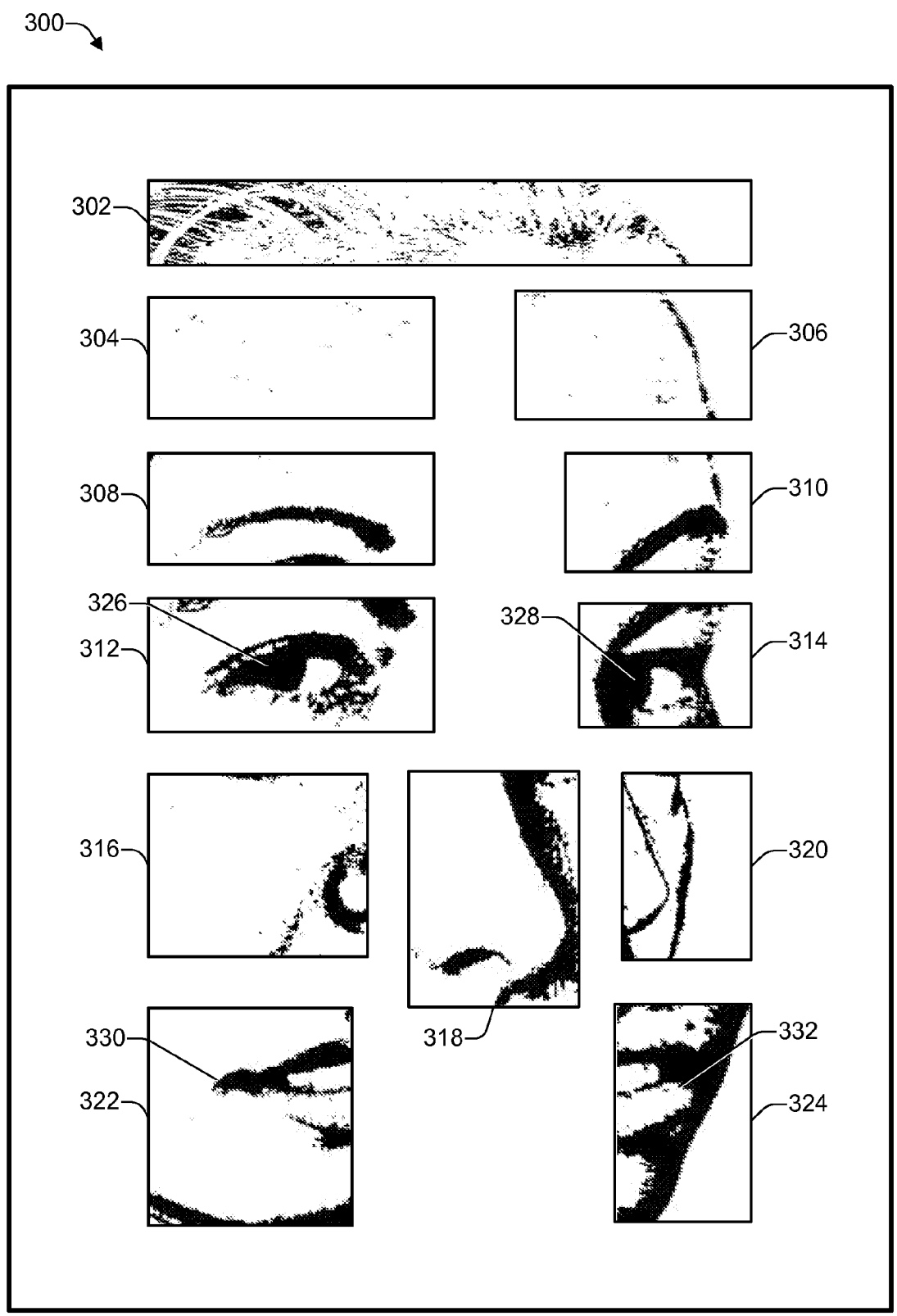
FIG. 3 illustrates an example of facial components according to some implementations.

FIG. 3 illustrates an example face representation of an input face 300 according to some implementations herein. For example, as mentioned above, some implementations may extract facial representation at the granularity of the facial component level. In the illustrated example, given the face 300 taken from the input image 102, twelve facial components 302-324 may be extracted and separately aligned based on four detected landmarks 326-332. The facial components in this example may include a hair component 302, a right forehead component 304, a left forehead component 306, a right eyebrow component 308, a left eyebrow component 310, a right eye component 312, a left eye component 314, a right cheek component 316, a nose component 318, a left cheek component 320, a right mouth component 322 and a left mouth component 324. The landmarks in this example are the right eye center 326, the left eye center 328, the right mouth corner 330 and the left mouth corner 332, although other landmarks may be used in other implementations. Furthermore, while the example of FIG. 3 divides face 300 into 12 components, more or fewer components may be used according to other implementations. Consequently, the implementations herein are not limited to the particular example.

Comparison and Matching

Some implementations herein may evaluate one or more representative low-level descriptors for carrying out a comparison and matching technique. Suitable low-level descriptors may include local binary pattern ("LBP"), as described, for example, by T. Ojala, M. Pietikainen, and T. Maenpaa in "Multiresolution gray-scale and rotation invariant texture classification with local binary patterns," *IEEE Transactions on Pattern Analysis and Machine Intelligence,* 24(7):971-987, 2002. Another suitable low-level descriptor may include scale invariant feature transform ("SIFT"), as described, for example, by D. Lowe in "Distinctive image features from scale-invariant keypoints," *International Journal of Computer Vision,* 60(2):91-110, 2004. Another suitable low-level descriptor may include a Gabor descriptor, as described, for example, by L. Wiskott, J. Fellous, N. Kruger, and C. Von der Malsburg in "Face recognition by elastic bunch graph matching" *IEEE Transactions on Pattern Analysis and Machine Intelligence,* 19(7):775-779, 1997. Yet another suitable low-level descriptor may include a Learning-based ("LE") descriptor, as described, for example, by Z. Cao, Q. Yin, J. Sun, and X. Tang in "Face recognition with Learning-based Descriptor," *In Proc. IEEE Conference on Computer Vision and Pattern Recognition,* 2010. For example, for the LBP descriptor, some implementations may use eight uniformly spaced circular neighbor sets (e.g., radius=3) and 59-code encoding. Additionally, for the Gabor descriptor, some implementations may use a default parameter as described by Wiskott et al. in the paper referenced above. Furthermore, with respect to the SIFT descriptor, a 32-orientation quantization may be applied. Also, with respect to the LE descriptor, some implementations may use the best sampling pattern and 256-code encoding, as described by Cao et al in the paper referenced above. Some implementations herein may use one or more of the example low-level descriptors described above, other suitable low-level descriptors, or other suitable matching techniques.

Additionally, to obtain a more discriminative representation, some implementations may apply a principal component analysis ("PCA") dimension reduction technique, as described for example, by Cao et al., in the paper referenced above, to obtain a compact descriptor $f_i$ for each facial component 302-324. The whole face 300 may be represented as $F=(f_1, f_2, \ldots, f_{12})$. The predictive model 100 may then determine a final similarity distance of two faces being compared. For example, some implementations may use a linear support vector machine ("SVM") to determine the similarity distance based on a fusion of the component-wise L2 distances. An example of this technique is provided by R.-E. Fan, P.-H. Chen, and C.-J. Lin in "Working Set Selection Using the Second Order Information for Training SVM," *Journal of Machine Learning Research* 6, 1889-1918, 2005. Alternatively, the predictive model 100 may use other suitable techniques for determining the similarity between two images or portions thereof.

Example Predictive Model

Figure 4:
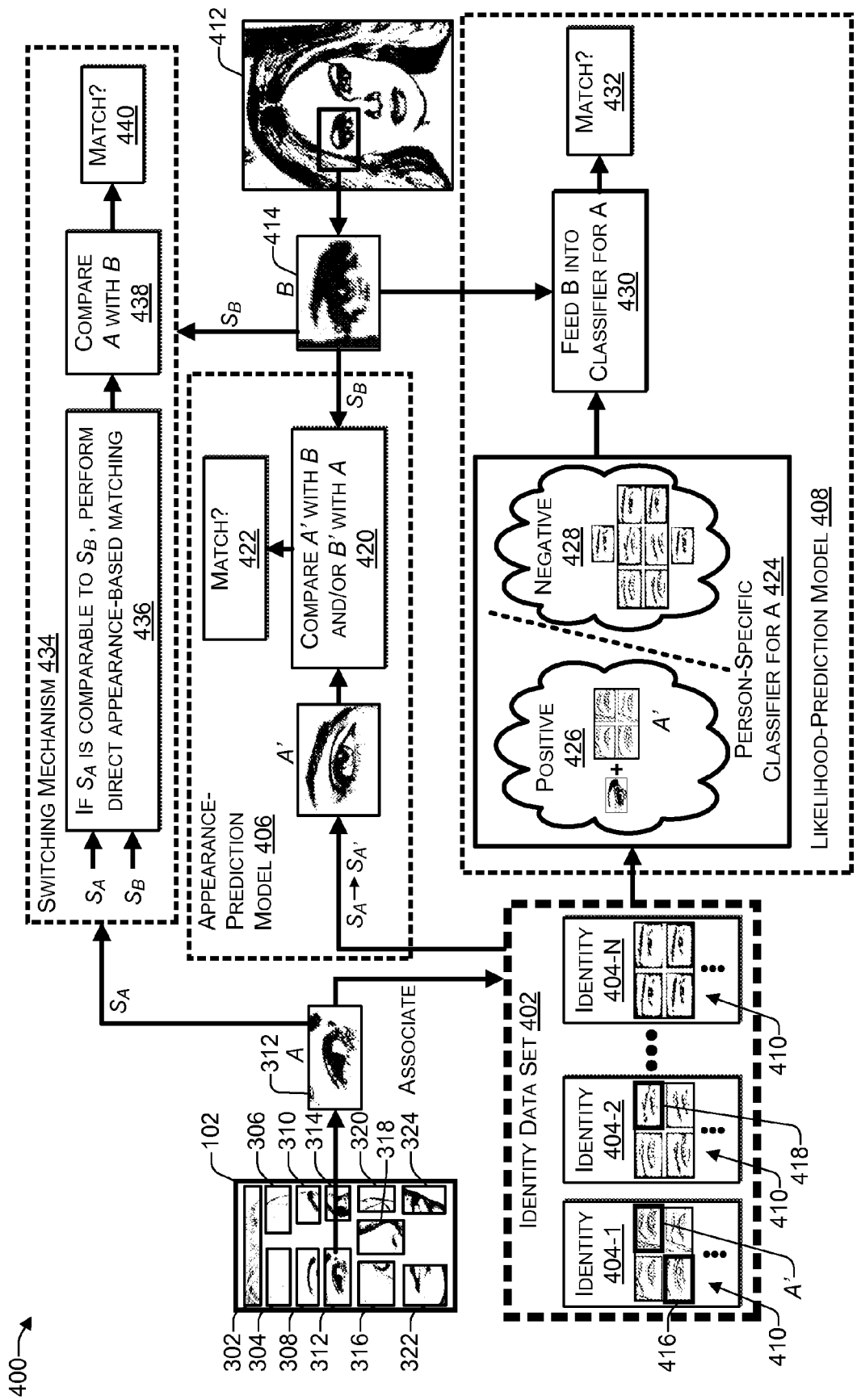
FIG. 4 is a diagram of an example framework for facial recognition, illustrating both appearance prediction and likelihood prediction according to some implementations.

FIG. 4 is a diagram of an example framework of a predictive model 400 for facial recognition according to some implementations. In some instances, the predictive model 400 may correspond to the predictive model 100 described above. The predictive model 400 may include an identity data set 402 containing a plurality of identities 404-1, 404-2, ..., 404-N, each of which may be similar to the identity 200 described above with reference to FIG. 2, or which may have more or fewer images, may include images of faces in various different types of intrapersonal settings, and so forth. For example, in one implementation, identity data set 402 may include 200 identities 404, each having 28 images of different intrapersonal settings. Further, in this example, the input image 102 may be represented as one or more facial components, such as facial components 302-324 described above with reference to FIG. 3. Additionally, the predictive model 400 may include one or more types of facial recognition prediction models. In the illustrated example, the predictive model 400 includes an "appearance-prediction" model 406 and a "likelihood-prediction" model 408.

The predictive model 400 may initially perform one or more association operations to associate the input image 102 with one or more images in the identities 404 in the identity data set 402. For example, the predictive model 400 may associate the input image 102 with similar generic identities 404 for each input facial component (e.g., facial components 302-324 of FIG. 3). The association operation may essentially provide an estimate of an intrapersonal setting for the input image 102 or portions thereof. To associate the input image 102 (or individual facial components thereof) with one or more identities 404 that are most similar, the predictive model 400 may use one or more of the descriptors (e.g., LBP, SIFT, Gabor and/or LE) described above, other descriptors, or other suitable matching techniques. For instance, the predictive model 400 may use the four descriptors, LBP, SIFT, Gabor and LE to compute descriptor distances between each input facial component 302-324 and all the corresponding facial components of each generic identity 404. For example, as illustrated in FIG. 4, for the right eye component 312 of the input image 102, the predictive model 400 may compute four descriptor distances corresponding to each of the four descriptors LBP, SIFT, Gabor and LE for the right eye components 410 of each image in each identity 404. The other facial components 302-324 of the input image 102 may be similarly compared with their corresponding facial components in the identities 404. Next, when multiple descriptors are used, the predictive model 400 determines an average descriptor distance for each facial component 302-324, and treats the averaged distance as a measure of similarity to the corresponding identity 404. Since in this example the predictive model 400 uses multiple facial components 302-324, the predictive model 400 may associate different identities 404 as being most similar to different facial components 302-324.

Following the association, one or both of the two prediction models 406, 408 may be applied based on a determined association(s), as described below. For example, based on one or more associated identities, some implementations predict a new appearance of the specific components 302-324 under a different setting ("appearance prediction"), while other implementations may directly predict the recognition output based on likelihood that a component from the input image belongs to the same person as a component from a stored image ("Likelihood prediction"). Further, in some implementations, following a "prediction" on each component, the component-level similarities may be combined or fused to provide a final decision on whether a match has been found.

Appearance Prediction

In the example of FIG. 4, suppose that the input image 102 is to be compared with a second image 412. Then, when operating on a facial component level, the right eye component 312 of the input image 102 may be labeled as facial component "A" in this example, and the right eye component 414 of the second image 412 may be labeled as facial component "B" in this example. The input image 102 is associated with the identity data set 402, as described above, to determine an estimated intrapersonal setting $s_A$. Thus, as described above, for component A, the predictive model 400 finds the "nearest" generic identity that has a corresponding component that is most similar to component A. For example, some implementations may use the L2 distance of the extracted face descriptors LBP, SIFT, Gabor and/or LE to measure the similarity.

Additionally, the facial component B from the second image 412 may also be associated with one or more of the identities 404 in the identity data set 402 in a similar manner to determine an estimated intrapersonal setting $s_B$. As discussed above, in some implementations, each generic identity 404 may contain 28 face images (e.g., 7 poses×4 illumination settings). For example, suppose that the predictive model 400 determines that the identity 404-1 includes a right-eye component 416 that is most similar to the right eye component A. Further, suppose that the predictive model 400 determines that the identity 404-2 includes a right-eye component 418 that is most similar to the right eye component B of the stored image 412. Accordingly, the right-eye component 418 of the identity 404-2 provides the estimated intrapersonal setting $s_B$ of facial component B. Furthermore, in the case in which the identities 404 include 28 intrapersonal settings, as described above, supposed that the selected right-eye component 418 of the identity 404-2 has a full-frontal pose (e.g., pose category 208 of FIG. 2) with left-and-right-flash illumination (e.g., illumination category 222) as the intrapersonal setting. Then, from the identity 404-1, a right-eye component A' corresponding to the full-frontal pose category 208 with left-and-right-flash illumination category 222 is substituted in place of the right-eye component A in the appearance-prediction model 406. In other words, from all the 28 face images in the first identity 404-1, the appearance-prediction model 406 selects the specific face image whose intrapersonal setting is equal to the intrapersonal setting $s_B$. Then, the appearance-prediction model 406 selects the corresponding right-eye component A' from this image. The selected right-eye component A' is the "predicted" appearance of the component A transitioned from setting $s_A$ to $s_B$, using A's nearest generic identity 404-1 as a bridge.

Using the predicted component A', any existing appearance-based matching method can be applied to calculate the distance $d_A = |f_{A'} - f_B|$ between the components A' and B, as indicated at block 420 to determine whether there is a match, as indicated at block 422. Alternatively or additionally, a B' component may be determined for second image 412 in a symmetrical implementation of the above process. Thus, a two-way comparison may be performed by also determining a distance $d_B = |f_{B'} - f_A|$ between B's predicted component B' and the facial component A. In other words, the input image 102 may be transitioned to the intrapersonal setting of the second image 412, the second image 412 may be transitioned to the intrapersonal setting of the first image 102, or, in some implementations, transitions may be performed in both directions and distances $d_A$ and $d_B$ are both calculated.

In some instances, the appearance-prediction model 406 can simply use the average of the two distances as the final distance between A and B, i.e., $$\frac{1}{2}(d_A + d_B).$$

However, in other implementations, the discriminative power of $d_A$ (and/or $d_B$) may be affected by the ability to find a sufficiently similar identity from the identity data set 402. For example, if the distance between A' and A is much smaller than the distance between B' and B, it makes sense to place greater weight on $d_A$, rather than simply to take the average of $d_A + d_B$. Accordingly, some implementations herein utilize an adaptive distance $d_p$, as follows:

$$d_p = \frac{1}{\alpha_A + \alpha_B}(\alpha_A d_A + \alpha_B d_B) \qquad (1)$$

where $\alpha_A = e^{-\gamma |f_{A'} - f_A|}$ and $\alpha_B = e^{-\gamma |f_{B'} - f_B|}$ are weights, and $\gamma$ is a control parameter (for example, the default value of $\gamma$ may be set to 5 in some implementations). The distances $d_A$ and $d_B$ should be normalized to a likelihood value between 0 and 1 before performing the adaptive fusion. Using the adaptive fusion mechanism of equation (1), the appearance-prediction model 406 performs well as long as the appearance-prediction model 406 is able to locate a good "nearest" generic identity 404 for at least one of the input faces in image 102 or image 412.

Figure 5:
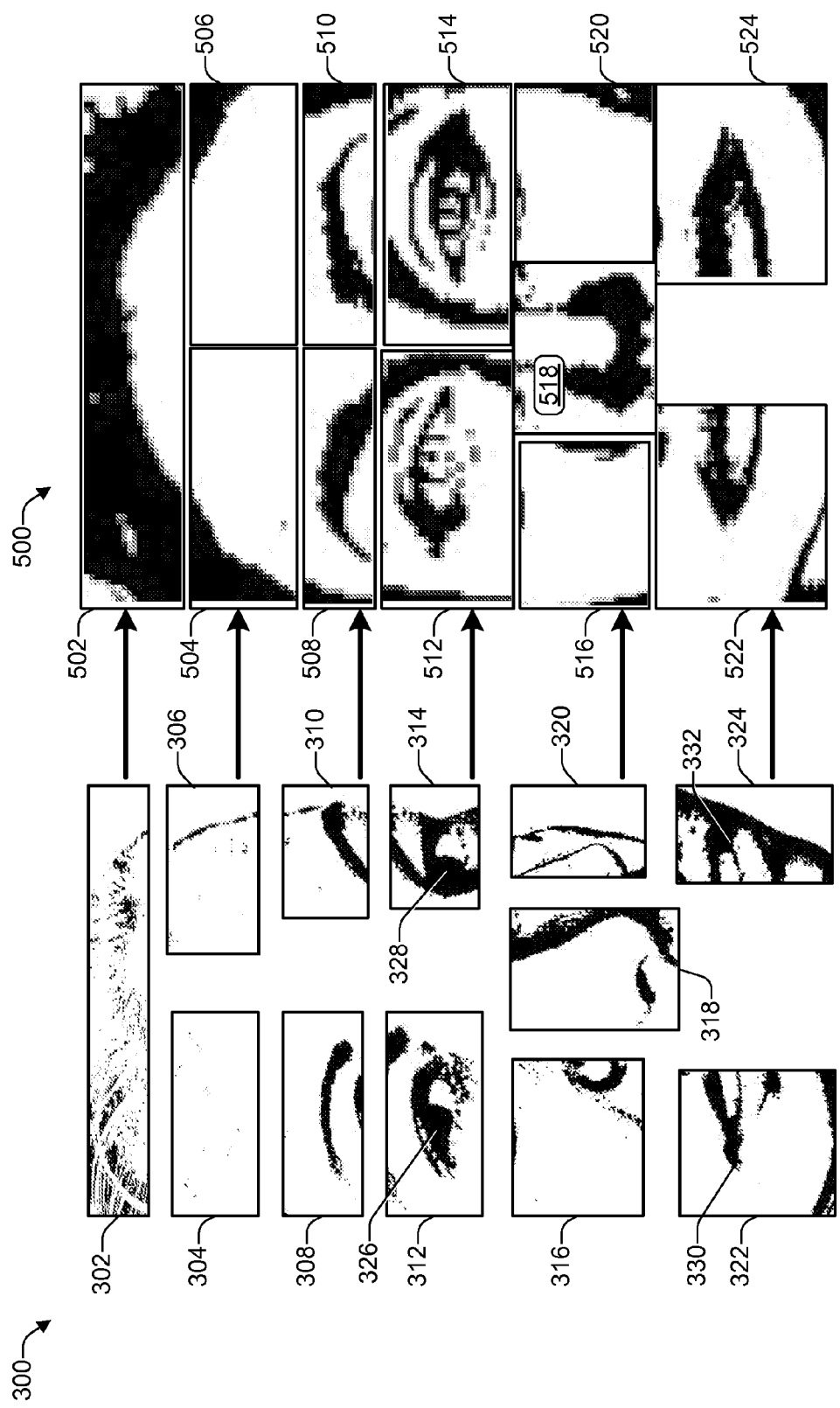
FIG. 5 illustrates an example of facial component alignment and prediction results according to some implementations.

After the appearance-prediction model 406 performs appearance-prediction on all the facial components 302-324, the appearance-prediction model 406 can obtain a new composite face 500, an example of which is illustrated in FIG. 5. In the example of FIG. 5, the composite face 500 includes the 12 facial components 302-324 transitioned by the appearance-prediction model 406, as described above, including a hair component 502, a right forehead component 504, a left forehead component 506, a right eyebrow component 508, a left eyebrow component 510, a right eye component 512, a left eye component 514, a right cheek component 516, a nose component 518, a left cheek component 520, a right mouth component 522 and a left mouth component 524, each of which corresponds to the components 302-324 as described above with reference to FIG. 3. Thus, the composite face 500 demonstrates a representation of the individual components 502-504 after appearance-prediction on each component 302-324. As a result, the pose category of the input face is transited from right-oriented (i.e., pose category 214 of FIG. 2) to full frontal (i.e., pose category 208). Illumination settings may have also been transitioned in this example. In the case in which second image 412 is also transitioned, a similar composite face may also be generated in the intrapersonal setting of the input image 102.

Following the appearance prediction on the facial components 302-324, as described above, the composite face 500 can be treated as a good approximation of the input face's appearance under a the intrapersonal setting of the second image 412. As a result, the appearance-prediction model 406 can compute a similarity distance between the composite face 500 and second image 412. In some implementations, a final distance may be determined based on a combination of the distances determined for each facial component 502-524. For example, in some instances, a linear SVM may be used to fuse the component-level distances to obtain the final distance between the whole faces for determining whether the faces match each other. Because the comparison is between two faces with consistent intrapersonal settings, implementations herein reduce the negative effect of intrapersonal variations.

Likelihood Prediction

Returning to FIG. 4, in some implementations, the likelihood-prediction model 408 may be used in place of or in addition to the appearance-prediction model 406 described above. In the likelihood-prediction model 408, some implementations may select, for example, a number of least-similar generic identities 404 to be the negative samples, and treat the remainder of the generic identities as candidates for positive sample augmentation. Thus, given two input facial components A and B, the likelihood-prediction model 408 first builds a person-specific classifier 424 using each facial components 302-324. For example, for the facial component A, the likelihood-prediction model 408 measures the likelihood of facial component B belonging to A. In some implementations, the likelihood-prediction model 408 may use a binary LDA (Linear Discriminant Analysis) classifier or other suitable classifier as the basic classifier. The likelihood-prediction model 408 generates the classifier 424 using the facial component A from the input image 102, along with all corresponding facial component images (e.g., under all 28 intrapersonal settings) of the K most-similar generic identities 404 to form the positive training samples 426. The negative training samples 428, a mentioned above, may be the J least-similar generic identities. For example, in some implementations, J may be the twenty least-similar identities 404, while K may be the three most-similar identities 404, although other values may be used.

After the training, the likelihood-prediction model 408 feeds facial component B into the classifier 424, as indicated at block 430. The likelihood-prediction model 408 then calculates the likelihood distance $d_A \in [0,1]$. A similar process can be used for second image 412 to train a second classifier (not shown in FIG. 4) for second image 412. Thus, facial component A may be fed into the second classifier and used to determine a distance $d_B \in [0,1]$. The likelihood-prediction model 408 may then compute a final distance for the facial components A and B using Equation (1). This process may be repeated for each of the 12 facial components 302-324. In some implementations, the likelihood-prediction model 408 may use the averaged distances between facial component A (or B) and the top K nearest identities 404 to compute the adaptive weight $\alpha_A$ (or $\alpha_B$). In both prediction models 406 and 408 a linear SVM may be used to fuse the component-level distances to obtain a final distance between the whole faces for determining whether the faces match each other.

Further, in some implementations, both the appearance-prediction model 406 and the likelihood-prediction model 408 may be used, resulting in two final distances between the input image 102 and the second image 412. The two final distances may be combined to determine a definitive distance indicative of whether the faces match each other. For example, the two final distances may be averaged to determine the definitive distance.

Switching Mechanism

In some implementations, the predictive model 400 may reduce the intrapersonal difference between images. However, when the input faces have very similar intrapersonal settings, the performance of the predictive model 400 may not be as reliable as direct appearance-based matching. For example, because the prediction models 406 and 408 rely on a transition through one or more identities 404 that are not exactly the same as the input image, the discriminative power of the predictive model 400 may be decreased when applied to images having a similar intrapersonal setting. Accordingly, some implementations herein may include a switching mechanism 434 to adaptively switch between direct appearance-based matching and the associate-predict-based matching provided by the prediction models 406 and 408. In other words, when two faces to be compared have close intrapersonal settings, the direct appearance-based matching can be used to directly compare component A with component B, as indicated at block 438, to determine whether there is a match as indicated at block 440; otherwise, when the two faces do not have similar intrapersonal settings, the prediction models 406 and 408 may be used to determine whether there is a match, as described above.

In some implementations, the intrapersonal settings in an identity may be quantified or categorized into different pose categories, lighting categories, expression categories and the like. For instance, the example identity 200 described above with reference to FIG. 2 includes seven pose categories 202-214 which may be assigned numeric values 1-7 (e.g., pose category 202 may be assigned a value of 1, pose category 204 may be assigned a value of 2, and so forth). There are also four illumination categories 216-222, which may be assigned values 1-4 (e.g., lighting category 216 may be assigned a value of 1, lighting category 218 may be assigned a value of 2, and so on). Further, other categorizing techniques for the intrapersonal settings may also be used, with the foregoing being just one example.

To implement the switching mechanism 434, some implementations may apply the following logic. Given two facial components (e.g., A and B) and their intrapersonal settings ($s_A = \{P_A, L_A\}$ and $s_B = \{P_B, L_B\}$) (where P is the pose and L is the illumination, such as described above with reference to the identity 200 of FIG. 2), the switching mechanism 434 may categorize the input pair of facial components A and B into one of two classes: "comparable" or "not comparable," using one or more thresholds for the difference between $s_A$ and $s_B$. In some implementations, the switching mechanism 434 may define the pair with differences $\{|P_A - P_B| < 3\}$ and $\{|L_A - L_B| < 3\}$ as being "comparable," although other threshold values may be used in other implementations. Further, the thresholds need not be the same value for different categories of intrapersonal settings. A pair that does not fall within the threshold requirements for being "comparable" is treated as "not comparable." In some implementations of the switching mechanism 434, the final matching distance $d_{sw}$ can be computed as a "hard" switch model:

$$d_{sw} = \begin{cases} d_a & \text{if "comparable"} \\ d_p & \text{otherwise,} \end{cases} \quad (2)$$

where $d_a$ and $d_p$ are, respectively, the distances from the direct appearance matching and the prediction models 406 and/or 408.

Other implementations of the switching mechanism 434 may employ a "soft" switch model, which may adaptively fuse distances $d_a$ and $d_p$:

$$d_{sw} = \begin{cases} \alpha_1 * d_a + (1 - \alpha_1) * d_p & \text{if "comparable"} \\ \alpha_2 * d_a + (1 - \alpha_2) * d_p & \text{otherwise} \end{cases} \quad (3)$$

where $\alpha_1$ and $\alpha_2$ are two weighting parameters learned from the training data. Thus, the soft switch implementations may carry out both direct appearance-based matching and prediction based matching and apply weighting factors to the determined distances based on parameters learned from the identity data set. The switching mechanism 434 can reduce the risk of inaccurate association/prediction caused by the limited size of the identity data set 402.

The example of FIG. 4 utilizes the twelve facial components 302-324 in the predictive model 400. However, the number of facial components used is not a limitation, and more or fewer facial components may be used in other implementations. For example, a single facial component comprising the entire face may be used in some implementations. However, the use of multiple facial components enables the predictive model 400 to have a greater chance of finding a more similar identity 404, and thereby reduces the risk of an inaccurate association. Implementations herein may employ both a whole face-level association and a facial-component-level association to find the most similar generic identities. After determining the most-similar identities, the remaining processing is the same for the two prediction models 406 and 408.

Example Architecture

Figure 6:
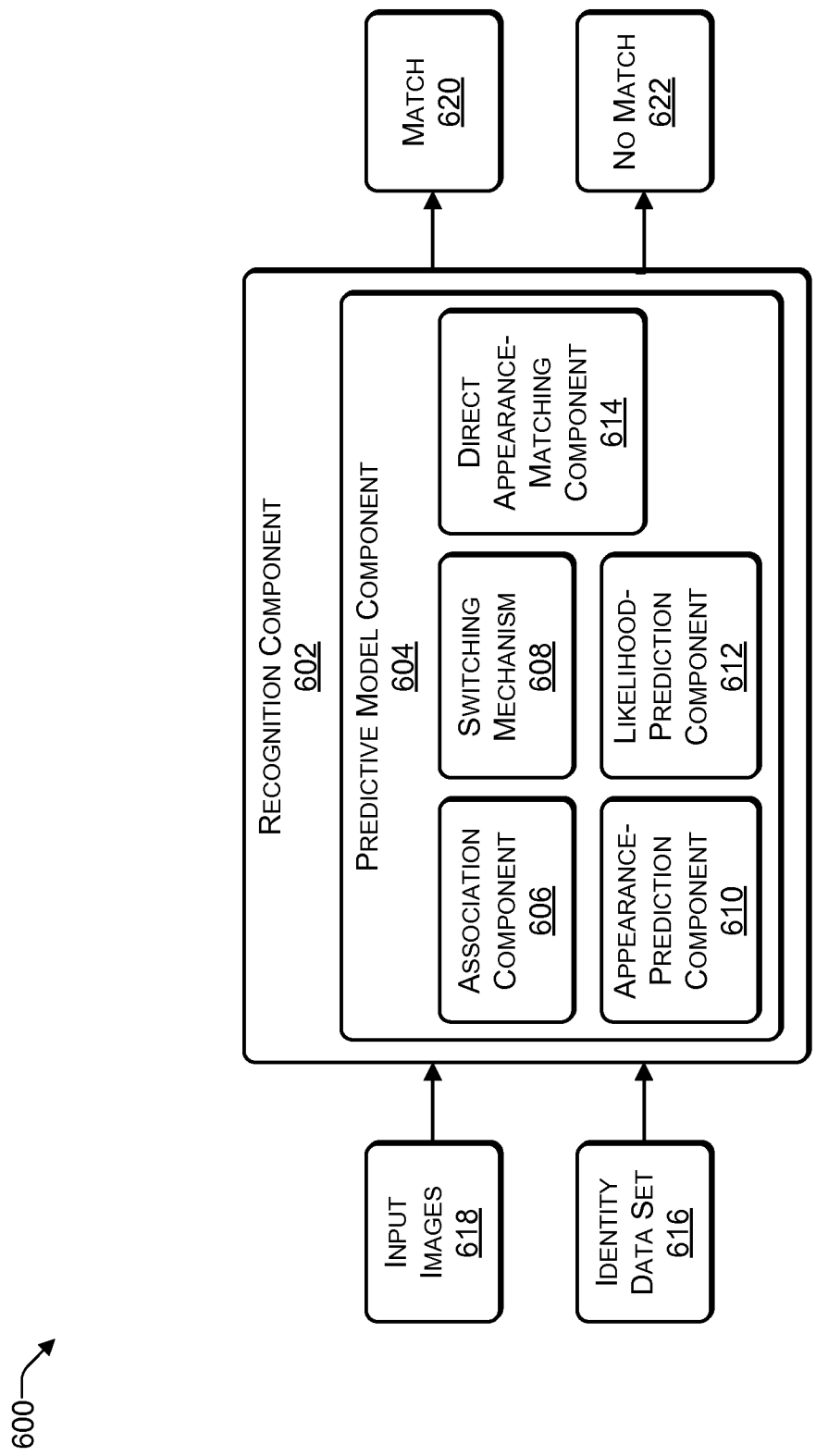
FIG. 6 is a block diagram of an example architecture for facial recognition according to some implementations.

FIG. 6 is a block diagram of an example architecture 600 of a recognition component 602 according to some implementations herein. In the illustrated example, recognition component 602 includes a predictive model component 604 which may be executed to provide the predictive models 100 and 400 described above. For example, predictive model component 604 may include a plurality of computer-readable, processor-executable instructions that may specifically program one or more processors to form a particular machine for performing the processes and functions described herein.

The predictive model component 604 may include an association component 606, a switching mechanism 608, an appearance-prediction component 610, a likelihood-prediction component 612, and a direct appearance-matching component 614. For example, the association component 606 may carry out the one or more association operations described above, such as selecting one or more identities from an identity data set 616 that are most similar to input images 618 or a facial component thereof. The switching mechanism 608 may determine whether to perform direct appearance-based matching or prediction-based matching in view of the results of the one or more association operations for the input images 618. When the switching mechanism 608 determines that prediction-based matching is to be carried out, the predictive model component 604 may execute at least one of the appearance-prediction component 610 or the likelihood prediction component 612 for performing the prediction based matching, as discussed above. For example, the appearance-prediction component 610 may be executed to implement the appearance-prediction model 406 described above. Further, the likelihood-prediction component 612 may be executed to implement the likelihood-prediction model 408 described above. When the switching mechanism 608 determines that the intrapersonal settings of the input images are comparable, the direct appearance-matching component 614 may perform appearance matching on the input images.

Accordingly, the recognition component 602 may receive two or more input images 618 and, based on the identity data set 616, may determine whether there is a match as indicated at block 620, or no match, as indicated at block 622. Furthermore, while FIG. 6 sets forth one example of a suitable architecture for a recognition component 602, numerous other possible architectures, frameworks, systems and environments will be apparent to those of skill in the art in view of the disclosure herein. Additionally, while the examples herein have been described in the environment of facial recognition, other implementations may be directed to other types of computer vision and recognition applications. Thus, the implementations herein may be extended to other types of intelligent vision systems.

Example Processes

Figure 7:
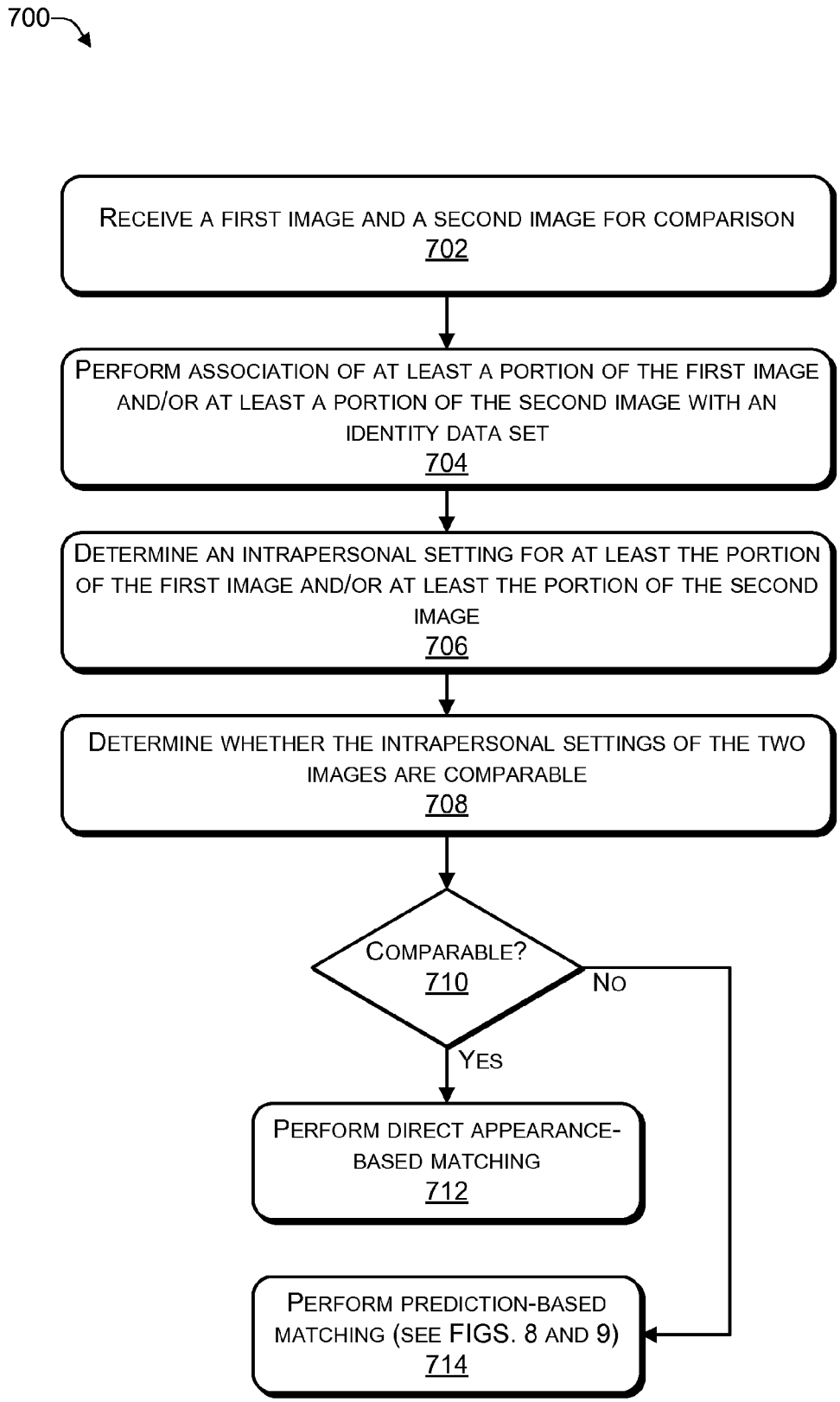
FIG. 7 is a flow diagram of an example process that includes association with an identity data set and a switching mechanism according to some implementations.
Figure 8:
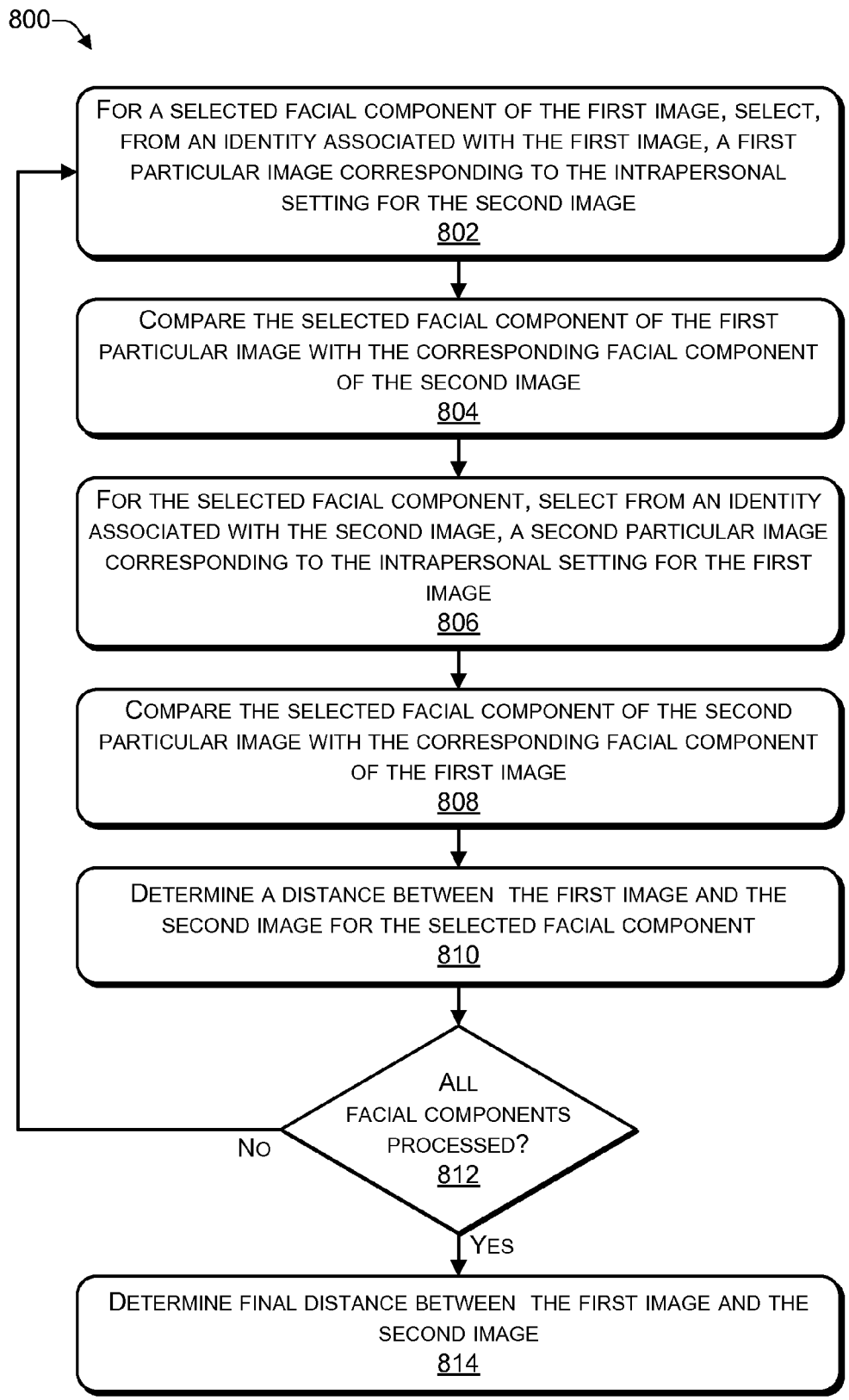
FIG. 8 is a flow diagram of an example process based on an appearance-prediction approach according to some implementations.
Figure 9:
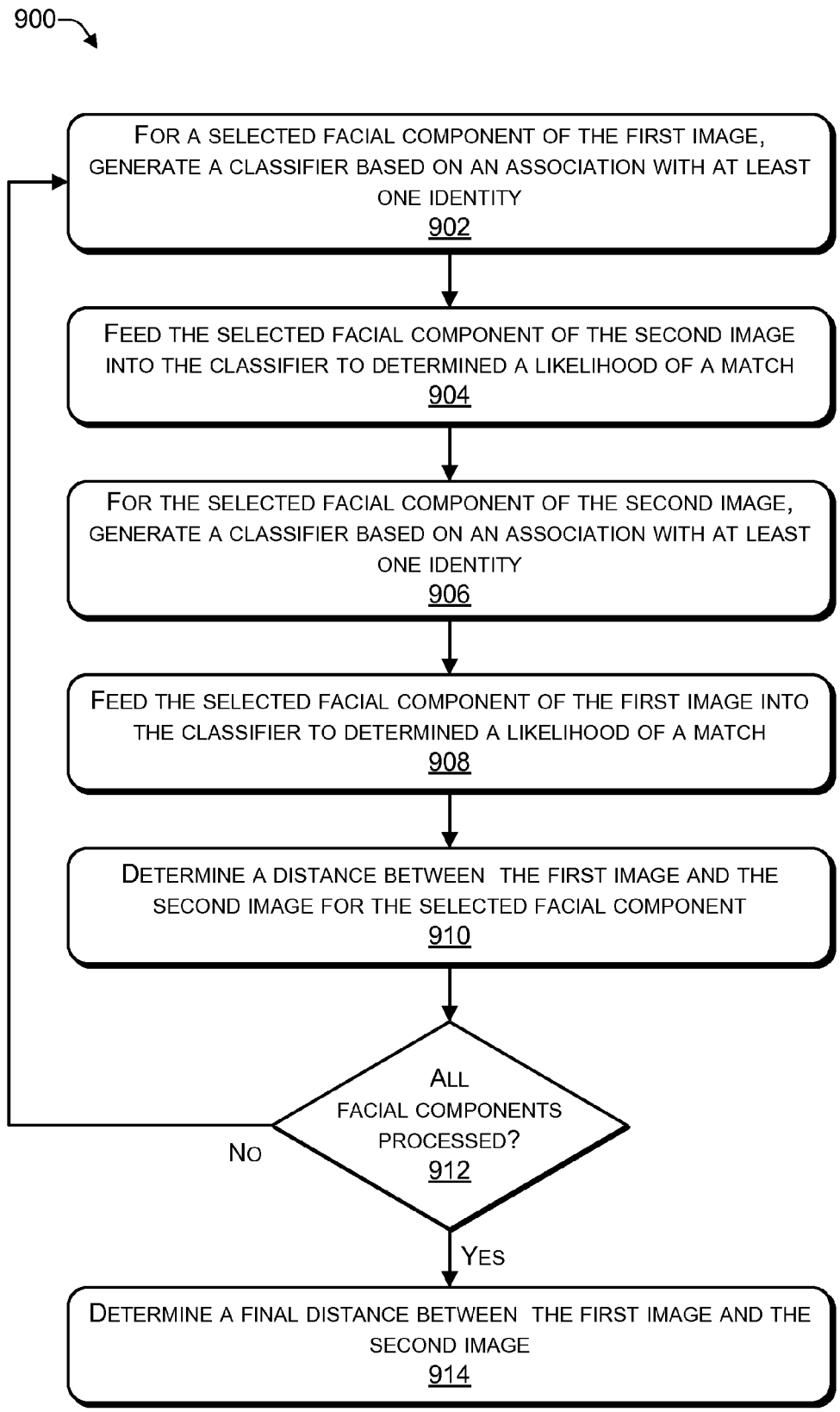
FIG. 9 is a flow diagram of an example process based on a likelihood-prediction approach according to some implementations.

FIG. 7 is a flow diagram of an example process 700 for facial recognition that includes association and a switching mechanism according to some implementations. Additionally, FIG. 8 is a flow diagram of an example process 800 for facial recognition based on the appearance-prediction model according to some implementations. Further, FIG. 9 is a flow diagram of an example process 900 for facial recognition based on the likelihood-prediction model according to some implementations. In the flow diagrams of FIGS. 7-9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700-900 are described with reference to the predictive models 100 and 400 described above, although other models, frameworks, systems and environments may implement these processes.

At block 702, the predictive model receives a first image and a second image for comparison. For example, the predictive model may carry out facial recognition by comparing the first image with the second image, or by comparing selected portions of the two images, to determine whether there is a match between the first and second images.

At block 704, the predictive model performs an association of at least a portion of the first image and/or second image with an identity data set. For example, an identity data set as described above may include a plurality of generic identities, each of which may include a plurality of images of an individual in various different intrapersonal settings. The predictive model may associate at least a portion of the first image and/or at least a portion of the second image with one or more of the images in the identity data set based on a determined similarity. For instance, one or more of the descriptors described above may be used for determining a similarity between the images.

At block 706, the predictive model may determine an intrapersonal setting for at least the portion of the first image and/or at least the portion of the second image. For example, when the switching mechanism described above is implemented, the predictive model may determine the intrapersonal settings for each of the first and the second images in order to implement the switching mechanism. Additionally, when the appearance-prediction model, when implemented, may also employ the determined intrapersonal settings.

At block 708, when the switching mechanism is implemented, the switching mechanism determines whether the intrapersonal settings of the two images are comparable. For example, the switching mechanism may determine a difference between categories of the intrapersonal settings for the two images, such as difference in pose category, difference in illumination category, difference in expression category, and the like. The switching mechanism may apply one or more threshold values to the differences for determining whether the intrapersonal settings are comparable or not comparable.

At block 710, when the switching mechanism determines that the intrapersonal settings of the two images are comparable, the process moves to block 712 to perform direct appearance-based matching. On the other hand, when the switching mechanism determines that the intrapersonal settings of the two images are not comparable, the process may move to block 714 to perform prediction-based matching.

At block 712, when the intrapersonal settings of the two images are comparable, the predictive model may perform appearance-based matching on the two images without performing any prediction-based matching. Alternatively, in the case of the soft switching mechanism described above, the predictive model may perform both direct appearance-based matching and prediction-based matching, and may combine the results using weighting factors as described above.

At block 714, when the intrapersonal settings of the two images are not comparable, the predictive model may perform prediction-based matching such as one or both of appearance-prediction matching, as additionally described in the process of FIG. 8, and likelihood-prediction matching, as additionally described in the process of FIG. 9.

FIG. 8 is a flow diagram of an example process 800 for appearance-prediction matching according to some implementations.

At block 802, for a selected facial component of the first image, the appearance-prediction model may select from an identity associated with the first image, a particular image corresponding to the intrapersonal setting determined for the second image. For example, as discussed above, a face may be divided into a plurality of facial components such as the twelve facial components 302-324 described above with reference to FIG. 3. Each of these facial components of the first image may be processed individually for comparison with the corresponding facial component of the second image, and vice versa. Alternatively, however, the entire face may be a single facial component that may be compared in its entirety with another face. As described above, during the association, the selected facial component of the first image is associated with an image having a most-similar facial component located in a particular identity in the identity data set. Thus, to transition to the intrapersonal setting of the second image, the appearance prediction model selects from the particular identity a first particular image corresponding to the intrapersonal setting of the second image (e.g., the particular image having the same pose category and illumination category in some implementations herein).

At block 804, the appearance prediction model compares the selected facial component of the particular image with the selected facial component of the second image. For example, the facial component of the first particular image may be compared with the facial component of the second image using one or more of the descriptors described above, or other appearance-based matching techniques.

At block 806, when two-way matching is to be performed, the appearance prediction model, for the selected facial component, selects from an identity associated with the second image, a second particular image corresponding to the intrapersonal setting for the first image. Accordingly, this operation is similar to that of block 802 but is executed in the reverse direction. Thus block 806 may be considered to mirror block 802.

At block 808, the appearance prediction model compares the selected facial component of the second particular image corresponding to the intrapersonal setting for the first image with the selected facial component of the first image. Consequently, block 808 mirrors block 804 described above.

At block 810, the appearance prediction model determines a distance between the first image and the second image for the selected facial component based on the results of blocks 804 and/or 808.

At block 812, if all the facial components have been selected and processed, the process moves to block 814; otherwise, the process goes back to block 802 to select a next facial component for processing.

At block 814, when all of the facial components have been processed, the appearance-prediction model may determine a final distance between the first image and the second image for determining, at least in part, whether there is a match between the two images.

FIG. 9 is a flow diagram of an example process 900 for likelihood-prediction matching according to some implementations. As mentioned above, the process 900 may be executed in addition to or in place of the appearance-prediction process 800 described above.

At block 902, for a selected facial component of the first image, the likelihood prediction model generates a classifier based on an association of the selected facial component of the first image with at least one identity in the identity data set. For example, the facial component of the first image may be associated with a subset of the identities in the identity data set that include facial components that are most-similar to the facial component of the first image, as determined, for example, using the one or more descriptors described above. The images in the one or more identities in the subset of identities may serve as positive samples in the classifier, while images from another subset of identities that are not similar to the facial component of the first image may be used as negative samples in the classifier.

At block 904, the likelihood prediction model feeds the corresponding facial component of the second image into the classifier of the first image determine a likelihood of a match between the facial component of the second image and the facial component of the first image.

At block 906, when two-way matching is to be carried out, the likelihood prediction model, for the selected facial component of the second image, generates a classifier for the second image based on an association of the facial component of the second image with at least one identity in the identity data set. Accordingly, the operations of block 906 mirror those of block 902 described above.

At block 908, the likelihood prediction model feeds the facial component of the first image into the classifier of the second image determine a likelihood of a match between the facial component of the first image and the facial component of the second image. Accordingly, the operations of block 908 mirror those of block 904 described above.

At block 910, the likelihood prediction model determines a distance between the first image and the second image for the selected facial component based on the results of block 904 and/or block 908.

At block 912, the likelihood prediction model determines whether all facial components have been processed. If not, the process returns to block 902 to process the next facial component; otherwise, the process proceeds to block 914.

At block 914, the likelihood prediction model determines a final distance between the first image and the second image based on a combination of the distances determine in block 910. For example, the likelihood-prediction model may use an SVM or other suitable merging technique for combining the distances of each facial component to obtain a final distance determination.

Example Computing Device and Environment

Figure 10:
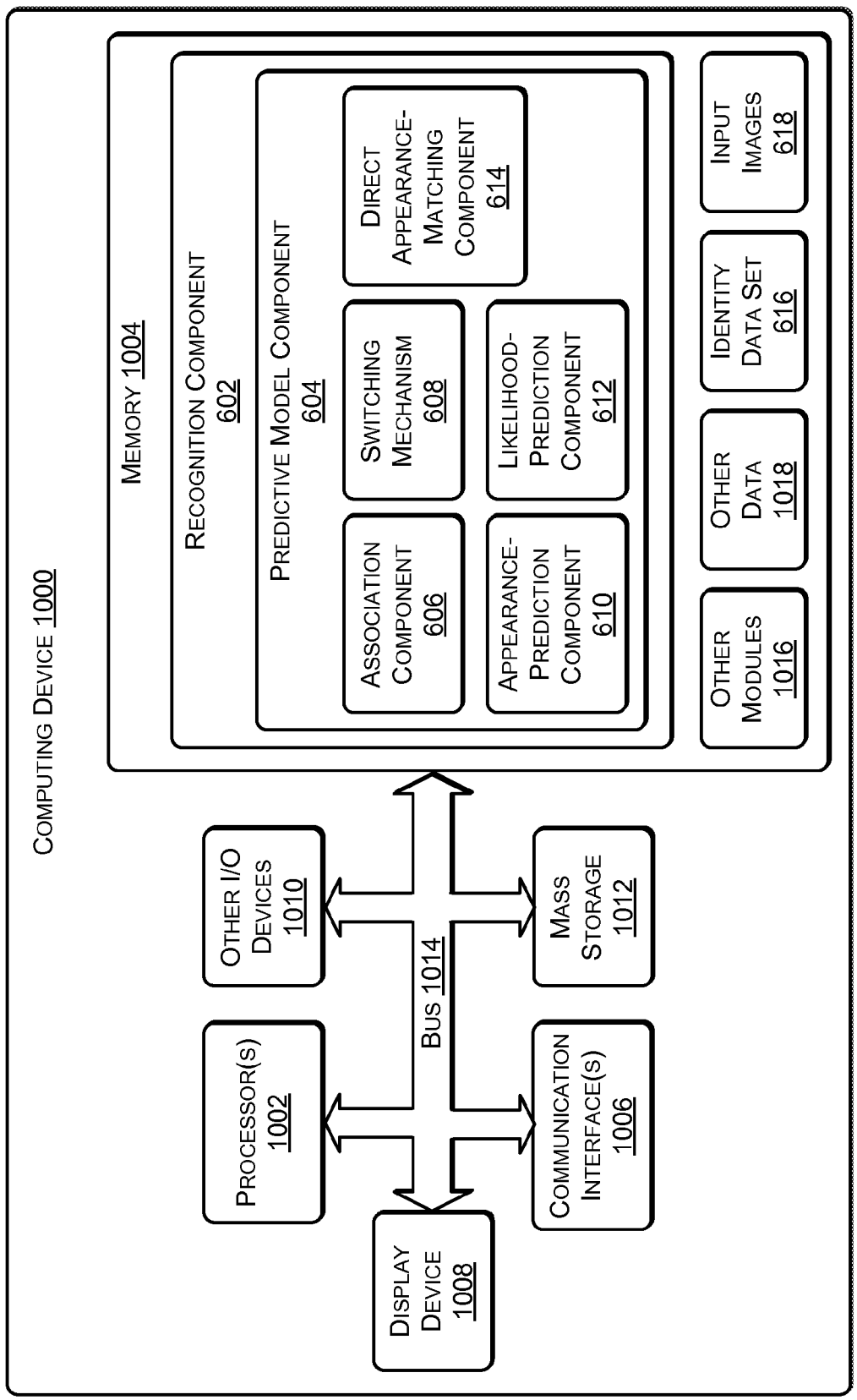
FIG. 10 is a block diagram of an example computing device and environment according to some implementations.

FIG. 10 illustrates an example configuration of a computing device 1000 and environment that can be used to implement the components and functions described herein. The computing device 1000 may include at least one processor 1002, a memory 1004, communication interfaces 1006, a display device 1008, other input/output (I/O) devices 1010, and one or more mass storage devices 1012, able to communicate with each other, such as via a system bus 1014 or other suitable connection.

The processor 1002 may be a single processing unit or a number of processing units, all of which may include single or multiple computing units or multiple cores. The processor 1002 can be implemented as one or more microprocessors, microcomputers, microcontrollers, digital signal processors, central processing units, state machines, logic circuitries, and/or any devices that manipulate signals based on operational instructions. Among other capabilities, the processor 1002 can be configured to fetch and execute computer-readable instructions stored in the memory 1004, mass storage devices 1012, or other computer-readable media.

Memory 1004 and mass storage devices 1012 are examples of computer storage media for storing instructions which are executed by the processor 1002 to perform the various functions described above. For example, memory 1004 may generally include both volatile memory and non-volatile memory (e.g., RAM, ROM, or the like). Further, mass storage devices 1012 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein. Memory 1004 may be a non-transitory media capable of storing computer-readable, processor-executable program instructions as computer program code that can be executed by the processor 1002 as a particular machine configured for carrying out the operations and functions described in the implementations herein.

The computing device 1000 may also include one or more communication interfaces 1006 for exchanging data with other devices, such as via a network, direct connection, or the like, as discussed above. The communication interfaces 1006 can facilitate communications within a wide variety of networks and protocol types, including wired networks (e.g., LAN, cable, etc.) and wireless networks (e.g., WLAN, cellular, satellite, etc.), the Internet and the like. Communication interfaces 1006 can also provide communication with external storage (not shown), such as in a storage array, network attached storage, storage area network, or the like.

A display device 1008, such as a monitor may be included in some implementations for displaying information and images to users. Other I/O devices 1010 may be devices that receive various inputs from a user and provide various outputs to the user, and may include a keyboard, a remote controller, a mouse, a printer, audio input/output devices, and so forth.

Memory 1004 may include modules and components for facial recognition according to the implementations herein. In the illustrated example, memory 1004 includes the recognition component 602 described above that affords functionality for performing the recognition functions described above. For example, as discussed above, recognition component 602 may include the predictive model component 604, which may be executed by the one or more processors 1002 to provide the predictive models 100 and/or 400 described above. Predictive model component 604 may include the association component 606, the switching mechanism 608, the appearance-prediction component 610, the likelihood-prediction component 612, and the direct appearance-matching component 614 described above. Memory 1004 may also include other data and data structures described herein, such as the identity data set 616 and one or more input images 618, which may include the input images 102 and 412, and/or the one or more stored images 104 and 106 discussed above. Memory 1004 may further include one or more other modules 1016, such as an operating system, drivers, communication software, or the like. Memory 1004 may also include other data 1018, such as data stored while performing the functions described above and data used by the other modules 1016.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 10 as being stored in memory 1004 of computing device 1000, recognition component 602, or portions thereof, may be implemented using any form of computer-readable media that is accessible by computing device 1000. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Implementations herein include a predictive model able to explicitly handle intrapersonal variations in a principled manner by using a plurality of generic identities as a bridge. The predictive model is able to adaptively switch between direct appearance-based matching and prediction-based matching depending on the degree of intrapersonal variation between two images being compared. Furthermore, while the predictive model has been described in the environment of a particular computer vision problem, namely, face recognition, the predictive model herein may be extended to other computer vision and recognition tasks. Accordingly, implementations herein are not limited to facial recognition.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
under control of one or more processors configured with executable instructions, determining a first intrapersonal setting of at least a portion of a first input image;
determining a second intrapersonal setting of at least a portion of a second image;
determining, based at least in part on a threshold for a difference between the first intrapersonal setting and the second intrapersonal setting, whether the first input image and the second image are comparable with each other for direct appearance matching; and
in response to determining that the first input image and the second image are not comparable with each other for direct appearance matching:
identifying a plurality of images of an identity data set that are associated with a different identity than an identity associated with the first input image;
identifying a nearest match between the at least the portion of the first input image and at least a portion of a first generic image of the plurality of images, wherein the first generic image is associated with a generic identity;
transforming the first input image into a third image by substituting at least a portion of a second generic image of the plurality of images with the at least the portion of the first input image, wherein the second generic image is associated with the generic identity; and
performing direct appearance matching between the second image and the third image.

2. The method as recited in claim 1, the determining the first intrapersonal setting of the at least the portion of the first input image further comprising:
accessing the identity data set including one or more identities, each identity in the identity data set including multiple images having different intrapersonal settings; and
associating the at least the portion of the first input image with at least one identity in the identity data set.

3. The method as recited in claim 2, the associating the at least the portion of the first input image with at least one identity in the identity data set further comprising:
dividing the first input image into a plurality of facial components; and
for each facial component:
comparing a selected facial component from the first input image with corresponding facial components contained in the multiple images in the one or more identities in the identity data set;
identifying, based on at least one descriptor distance, a facial component in the identity data set that is a nearest component match to the selected facial component from the first input image; and
determining, as the first intrapersonal setting, an intrapersonal setting of the facial component in the identity data set that is the nearest component match to the selected facial component from the first input image, wherein the facial component of the identity data set is associated with a different identity than the selected facial component from the first input image.

4. The method as recited in claim 2, the accessing the identity data set further comprising accessing a plurality of identities, a first identity in the plurality of identity containing a plurality of images of the first identity in a variety of intrapersonal settings comprising at least one of:
different poses;
different lighting;
different facial expressions; or
different obscured facial features.

5. The method as recited in claim 1, the determining whether the first input image and the second image are comparable further comprising:
accessing the identity data set including a plurality of identities, each identity of the plurality of identities including multiple images categorized in different categories of intrapersonal settings;
determining an intrapersonal setting first category value corresponding to the at least the portion of the first input image;
determining an intrapersonal setting second category value corresponding to the at least the portion of the second image; and
determining that the first input image and the second image are comparable when a difference between the first category value and the second category value is within the threshold for the difference between the first intrapersonal setting and the second intrapersonal setting.

6. The method as recited in claim 1, further comprising, in response to determining that the first input image and the second image are comparable with each other for direct appearance matching, performing direct appearance matching between the first input image and the second image.

7. The method as recited in claim 6, further comprising performing likelihood-prediction matching using a classifier generated for the first input image based on similarity of the first input image to one or more identities in the identity data set.

8. The method as recited in claim 7, further comprising generating the classifier by selecting a first subset of identities in the identity data set as negative samples and selecting at least one identity in the identity data set as a positive sample, the at least one identity determined to be most similar of identities in the identity data set to at least the portion of the first input image.

9. The method as recited in claim 8, further comprising feeding the at least the portion of the second image into the classifier to determine a likelihood of the at least the portion of the second image being a match with the at least the portion of the first input image.

10. The method as recited in claim 1, wherein the transforming is further based on comparing a predicted portion of the second image, predicted for the first intrapersonal setting, with the portion of the first input image.

11. One or more computer storage media storing instructions executable by one or more processors to perform operations comprising:
 determining a first intrapersonal setting of at least a portion of a first input image;
 determining a second intrapersonal setting of at least a portion of a second image; and
 determining whether the first input image and the second image are comparable with each other for direct appearance matching based at least in part on a difference between the first intrapersonal setting and the second intrapersonal setting;
 in response to determining that the first input image and the second image are not comparable with each other for direct appearance matching, transforming the first input image into a third image by substituting the at least the portion of the first input image with a portion of a generic image associated with a generic identity in an identity data set comprising a plurality of images.

12. The one or more computer storage media as recited in claim 11, the operations further comprising performing direct appearance matching between the first input image and the second image in response to determining that the first input image and the second image are comparable with each other for direct appearance matching.

13. The one or more computer storage media as recited in claim 11, the operations further comprising determining that one or more images in the plurality of images of the identity data set is similar in appearance to the second image.

14. The one or more computer storage media as recited in claim 11, wherein the transforming the first input image into the third image is based on one or more transitions between the plurality of images of the identity data set.

15. The one or more computer storage media as recited in claim 11, the operations further comprising performing direct appearance matching between the second image and the third image.

16. A system comprising:
 one or more processors;
 a memory that includes a plurality of processor-executable instructions to cause the one or more processors to perform operations comprising:
  accessing an identity data set including one or more identities, each identity in the identity data set including multiple images having different intrapersonal settings;
  associating at least a portion of a first input image with at least one identity in the identity data set;
  determining a first intrapersonal setting of at least the portion of the first input image based on the associating;
  determining a second intrapersonal setting of at least a portion of a second image;
  determining whether to perform direct appearance matching or prediction-based matching between the first input image and the second image based on a difference between the first intrapersonal setting and the second intrapersonal setting;
  in response to determining to perform prediction-based matching between the first input image and the second image, transforming the first input image into a third image based at least on transitions between images of the identity data set and at least one substitution of the at least the portion of the first input image with at least a portion of a generic image associated with the at least one identity in the identity data set, wherein the at least one identity is a generic identity; and
  performing direct appearance matching between the third image and the second image.

17. The system as recited in claim 16, the associating at least the portion of the first input image with the at least one identity in the identity data set further comprising:
 dividing the first input image into a plurality of facial components; and
 for each facial component:
  comparing a selected facial component from the first input image with corresponding facial components contained in the multiple images in the one or more identities in the identity data set;
  identifying, based on at least one descriptor distance, a facial component in the identity data set that is a nearest match to the selected facial component from the first input image; and
  determining, as the first intrapersonal setting, an intrapersonal setting of the facial component in the identity data set that is the nearest match to the selected facial component from the first input image, wherein the facial component of the identity data set is associated with a different identity than the selected facial component from the first input image.

18. The system as recited in claim 16, wherein the operations further comprise performing the prediction-based matching between the first input image and the second image based at least in part on determining that the difference between the first intrapersonal setting and the second intrapersonal setting is not within a threshold for the difference.

19. The system as recited in claim 18, the performing the prediction-based matching comprising performing likelihood-prediction matching using a classifier generated for the first input image based on similarity of the first input image to the one or more identities in the identity data set.

20. The system as recited in claim 19, the performing the likelihood-prediction matching further comprising generating the classifier by selecting a first subset of identities in the identity data set as negative samples and selecting at least one identity in the identity data set as a positive sample, the at least one identity determined to be most similar of identities in the identity data set to the at least the portion of the first input image.

* * * * *